US010527207B2

(12) United States Patent
Manning et al.

(10) Patent No.: US 10,527,207 B2
(45) Date of Patent: Jan. 7, 2020

(54) HIGH CAPACITY UNIVERSAL CONNECTOR

(71) Applicant: Dril-Quip, Inc., Houston, TX (US)

(72) Inventors: Mark A. Manning, Houston, TX (US);
Blake T. DeBerry, Houston, TX (US);
Morris B. Wade, Houston, TX (US);
Bruce J. Witwer, Cypress, TX (US)

(73) Assignee: Dril-Quip, Inc., Houston, TX (US)

( * ) Notice: Subject to any disclaimer, the term of this patent is extended or adjusted under 35 U.S.C. 154(b) by 203 days.

(21) Appl. No.: 15/582,268

(22) Filed: Apr. 28, 2017

(65) Prior Publication Data

US 2018/0163902 A1 Jun. 14, 2018

Related U.S. Application Data

(60) Provisional application No. 62/432,444, filed on Dec. 9, 2016.

(51) Int. Cl.
*E21B 33/038* (2006.01)
*F16L 15/00* (2006.01)
*F16L 15/08* (2006.01)

(52) U.S. Cl.
CPC .............. *F16L 15/008* (2013.01); *F16L 15/08* (2013.01)

(58) Field of Classification Search
CPC ........ E21B 33/038; F16L 15/008; F16L 15/08
See application file for complete search history.

(56) References Cited

U.S. PATENT DOCUMENTS

| 3,321,217 A | * | 5/1967 | Ahlstone | E21B 33/038 166/338 |
| 3,325,190 A | * | 6/1967 | Eckert | E21B 33/038 166/338 |
| 3,350,103 A | * | 10/1967 | Ahlstone | E21B 33/038 277/323 |
| 3,350,104 A | * | 10/1967 | Hynes | E21B 33/038 277/323 |
| 3,719,070 A | * | 3/1973 | Hanes | E21B 33/038 285/18 |

(Continued)

FOREIGN PATENT DOCUMENTS

GB             2186043 A     8/1987

OTHER PUBLICATIONS

Search report issued in related UK application No. GB1718849.1, dated Mar. 15, 2018, 4 pages.

(Continued)

*Primary Examiner* — Matthew R Buck
(74) *Attorney, Agent, or Firm* — Baker Botts L.L.P.

(57) ABSTRACT

A high capacity universal connector for use in connecting tubular members and a method for sealing the tubular members is provided. First and second tubular members are provided which each have ends that are brought into face-to-face engagement by a connector. A metal sealing element seals against conical surfaces at the ends of the first and second tubular members and enables the entire surface of the end of one tubular member to be bought into engagement with the surface of the end of the other tubular member so as to improve the bending and compression capacity of the assembly comprising the tubular members and the metal sealing element. A metal sealing ring for use in this assembly is also provided, along with a gasket retention assembly.

15 Claims, 16 Drawing Sheets

(56) References Cited

U.S. PATENT DOCUMENTS

| | | | | |
|---|---|---|---|---|
| 4,214,763 | A * | 7/1980 | Latham | F16L 23/20 |
| | | | | 277/614 |
| 4,433,859 | A * | 2/1984 | Driver | E21B 33/038 |
| | | | | 285/315 |
| 4,496,172 | A * | 1/1985 | Walker | F16L 37/002 |
| | | | | 285/18 |
| 4,526,406 | A * | 7/1985 | Nelson | E21B 33/038 |
| | | | | 285/18 |
| 4,708,376 | A * | 11/1987 | Jennings | E21B 33/038 |
| | | | | 285/18 |
| 4,902,044 | A * | 2/1990 | Williams | E21B 33/038 |
| | | | | 166/340 |
| 4,941,691 | A | 7/1990 | Reimert | |
| 5,039,140 | A * | 8/1991 | Szymczak | E21B 33/03 |
| | | | | 285/334.2 |
| 5,103,915 | A | 4/1992 | Sweeney et al. | |
| 5,255,743 | A * | 10/1993 | Adam | E21B 33/038 |
| | | | | 166/345 |
| 5,634,671 | A * | 6/1997 | Watkins | E21B 17/085 |
| | | | | 166/344 |
| 5,755,287 | A * | 5/1998 | Cain | E21B 33/038 |
| | | | | 166/368 |
| 6,138,762 | A | 10/2000 | Sweeney et al. | |
| 6,409,176 | B2 | 6/2002 | Allen | |
| 6,824,171 | B2 * | 11/2004 | Milberger | E21B 33/038 |
| | | | | 285/123.13 |
| 7,025,360 | B2 * | 4/2006 | Walker | E21B 33/03 |
| | | | | 277/652 |
| 7,614,453 | B2 * | 11/2009 | Spiering | E21B 33/038 |
| | | | | 166/338 |
| 8,096,560 | B2 * | 1/2012 | Pallini, Jr. | E21B 33/043 |
| | | | | 277/339 |
| 9,169,710 | B2 * | 10/2015 | Jahnke | E21B 33/038 |
| 9,222,609 | B1 * | 12/2015 | Lee | F16L 23/20 |
| 2001/0045711 | A1 | 11/2001 | Johnson | |
| 2003/0000694 | A1 | 1/2003 | Sweeney et al. | |
| 2005/0082764 | A1 | 4/2005 | Smith, III | |
| 2005/0126788 | A1 | 6/2005 | Crozier | |
| 2009/0322029 | A1 | 12/2009 | Pallini, Jr. et al. | |

OTHER PUBLICATIONS

Search report issued in related UK application No. GB1900329.2, dated Apr. 5, 2019, 5 pages.

Search report issued in related UK application No. GB1900330.0 dated Apr. 9, 2019, 5 pages.

* cited by examiner

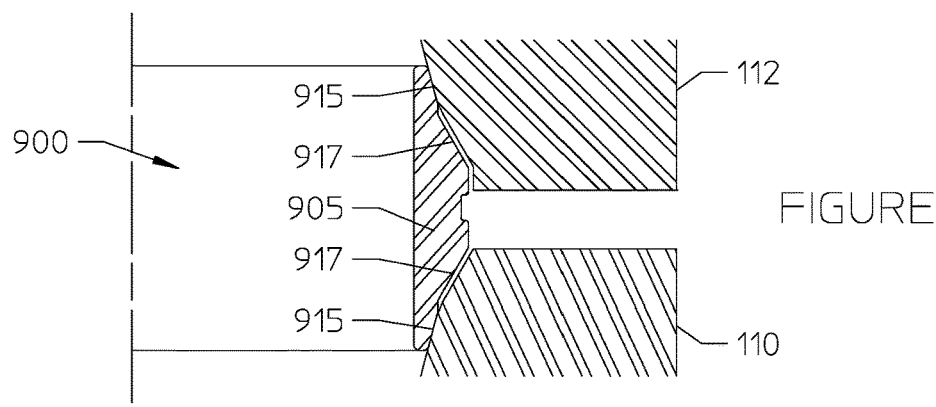
FIGURE 8A
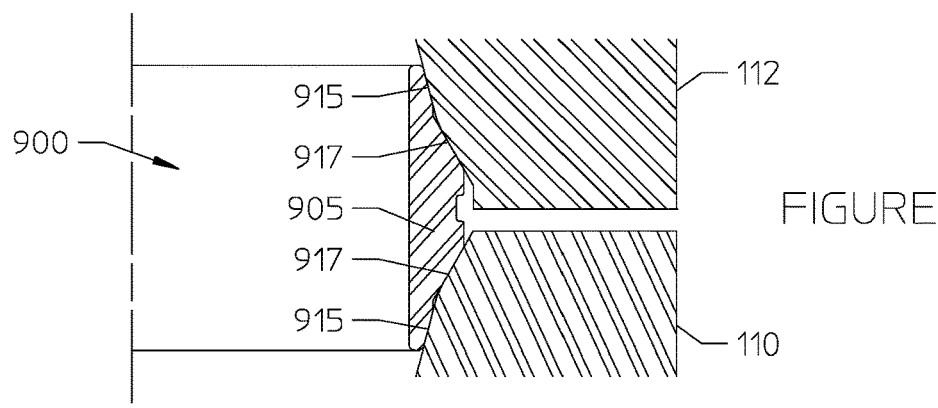
FIGURE 8B
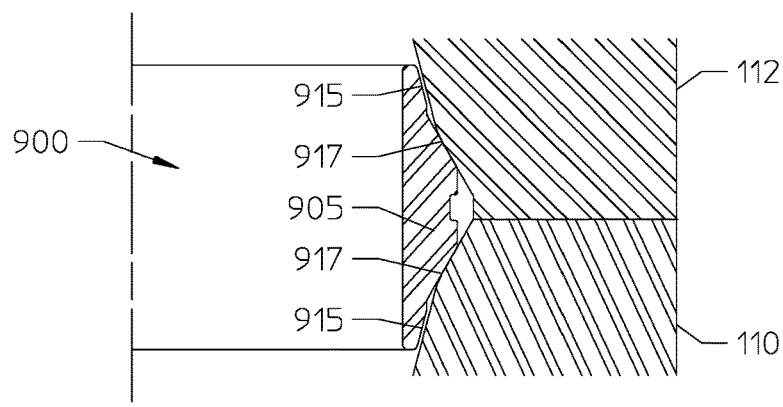
FIGURE 8C
FIGURE 8

HIGH CAPACITY UNIVERSAL CONNECTOR

CROSS REFERENCE TO RELATED APPLICATION

The present application claims the benefit of U.S. Provisional Application Ser. No. 62/432,444, entitled "High Capacity Universal Connector", filed on Dec. 9, 2016.

TECHNICAL FIELD

Embodiments described herein relate generally to oil and gas production and drilling operations, and specifically to increased surface area at the interfacing surfaces of housings and associated connectors, improved gaskets, and gasket retention devices that enable the same.

BACKGROUND

A subsea well has a housing located at the subsea floor. The housing is defined by a tubular member having a bore. A connector may be a similarly tubular member with a bore. The connector may be lowered from a vessel, located at the surface, toward the housing, where the connector may connect the subsea housing to the surface by coupling to the exterior of the housing. The housing may further comprise one or more upward-facing shoulders on its upper end that are operable to interface with one or more downward-facing shoulders on the lower end of the connector. The connector main body may comprise a recess located radially inward from one of the downward-facing shoulders. Both the housing and connector may comprise a grooved profile on their outer diameter to enable a locking ring to couple the housing and connector together to create a final assembly.

A metal seal ring, or gasket, may be positioned between the tubular members and flexibly seal between the members. Gaskets are available in a variety of configurations, including AX, BX, CX, DX, RX, and VX types. A gasket may comprise an upper conical surface and a lower conical surface that are operable to create a seal when the upper conical surface of the gasket comes into contact with a downward-facing conical surface of the connector and the lower conical surface of the gasket comes into contact with the upward-facing conical surface of the housing. Such gaskets are often constructed having one or more ribs, which extend radially outward from the gasket. The one or more ribs may enable alignment of the gasket and may interact with a retention device to maintain the gasket's position between the tubular members during operations.

One problem with gaskets including one or more ribs is that the ribs are designed to interface with a recess formed within or between the tubular members. This recess reduces the surface area of the tubular members, as well as the area of the interface between the tubular members. If the recess appears in the housing or in the connector of a wellhead assembly, the recess may weaken the assembly, such that it may be more susceptible to the forces associated with bending and compressing the assembly. High pressure/high temperature (HP/HT) subsurface drilling, with temperatures reaching and exceeding 350° F. and pressures reaching and exceeding 15,000 PSI, imposes particularly high demands on all elements of the assembly. Therefore, any reduction in the strength, flexibility, or both of the assembly may impact operational capacity of the assembly and may lead to undesirable results when the assembly is subjected to loads seen in challenging subsea and other environments.

The present invention is designed to increase the interface of the surface area of the housing and connector at the shoulders of these tubular members and thereby increase the load that the connected tubular members can withstand from wellbore pressures and temperatures.

BRIEF DESCRIPTION OF THE DRAWINGS

Some specific exemplary embodiments of the disclosure may be understood by referring, in part, to the following description and the accompanying drawings.

FIGS. 8A-C are side cross sectional views illustrating a progression of contact between a gasket and tubular members as the gasket moves into alignment and the tubular members contact one another.

DETAILED DESCRIPTION

Figure 1:
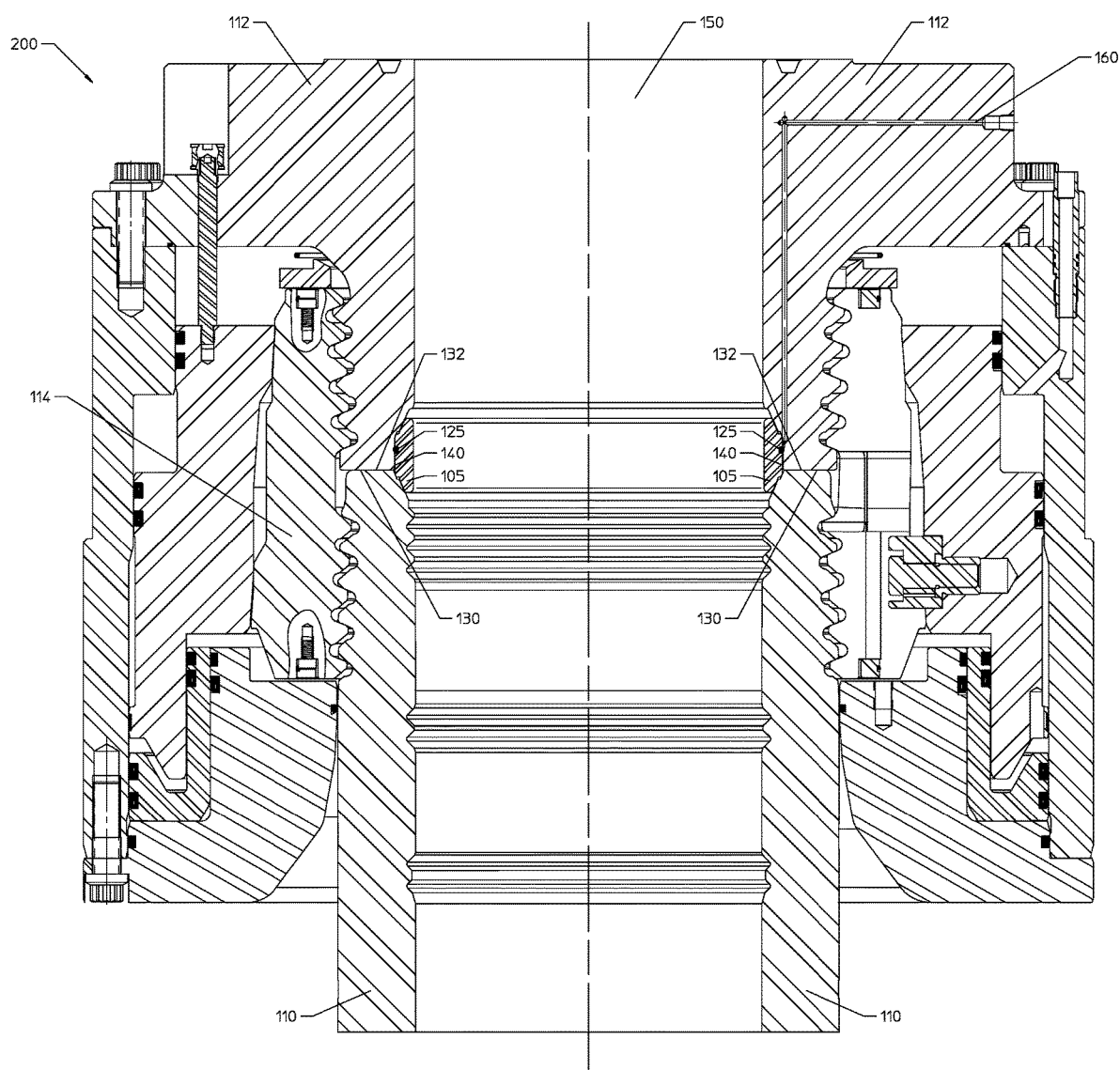
FIG. 1 is a side cross sectional view of an assembly comprising a housing, a connector, a gasket, and a locking ring, according to one or more aspects of the present disclosure.

The present invention overcomes one or more deficiencies in the prior art by providing systems and methods for increasing the interfacing surface area of tubular members, including but not limited to subsea housing assemblies, which may include wellheads, spools, adapters, and blow out preventer connections.

In one or more embodiments, the surface area of the tubular members may be increased by removing one or more ribs extending from the gasket. Similarly, the gasket may be reduced in size and thickness to enable an increase in the interfacing surface areas of the tubular members. For example, the contact area of the tubular members may be increased by between 10% and 40% compared to existing designs by removing the one or more ribs from the gasket, which may proportionally increase the bending and compression capacity of the complete assembly by 10% up to 40%.

The gasket may be aligned between the tubular members by tapered distal alignment segments near the vertical extremities of the gasket and radially central alignment segments on the gasket. In certain embodiments, the gasket may include both distal and radially central alignment segments operable to engage the conical segments of the tubular members and ensure alignment of the gasket. In other embodiments, the gasket may include the distal alignment segments but not the radially central alignment segments, while in still further embodiments, the gasket may include the radially central alignment segments but not the distal alignment segments. The gasket may further include a split ring, a tab configuration, and/or other configurations that would be familiar to one of ordinary skill in the art.

Embodiments according to the present disclosure are also directed to an improved connector/wellhead gasket retention assembly. Unlike existing gasket retention systems, the disclosed assembly does not require a large recess formed through the tubular housing or connector. Instead, the disclosed gasket retention assembly has a small footprint that helps to minimize impact to the wellhead/connector capacity by ensuring a large contact surface at the interface of the housing and connector.

The gasket retention assembly generally includes a port formed through the tubular connector, a spring loaded plunger disposed in a recess of the connector, this recess being fluidly coupled to the port, and a spring loaded retention mechanism that the plunger passes through. The spring loaded retention mechanism interfaces directly with a gasket of the tubular assembly to hold the gasket in position against the wellhead connector. The spring loaded retention mechanism may be oriented perpendicular to the spring loaded plunger. The gasket retention assembly may also include a valve or other closure mechanism disposed at a distal end of the port to enable specific hydraulic control of the gasket retention assembly. The gasket retention assembly is self-energizing and can be operated hands free (e.g., automatically or via hydraulic control inputs from an ROV or control line) to selectively engage/disengage the gasket from the retention mechanism. This allows for relatively easy removal and replacement of the gasket from the wellhead assembly at the subsea location using an ROV.

FIG. 1 is a diagram illustrating an assembly 200 including a housing 110, a connector 112, and a gasket 105, according to one or more aspects of the present disclosure. The assembly 200 may include a tubular housing 110 having a central bore 150 that may contact a tubular connector 112, where the connector 112 also has a central bore 150. The housing 110 and connector 112 may be secured by a locking ring 114. The locking ring 114 may surround the housing 110 and connector main body 112. The gasket 105 may include a conical upward facing surface, a conical downward facing surface, and a central bore 150. The gasket 105 may create a seal when the conical upward facing surface of the gasket 105 contacts a conical downward-facing shoulder of the connector 112 and the conical downward-facing surface of the gasket 105 contacts a conical upward-facing shoulder of the housing 110. A retention device 125 may reside in a recess in the gasket 105. The retention device 125, which may include an elastomeric seal (such as an o-ring, s-seal, polypak, or t-seal), a plunger, or a mechanical, hydraulic, or auto-release configuration of retention device, may operate to maintain the position of the gasket 105. As illustrated in FIG. 1, a blowout valve 160 may pass through the connector 112 to allow air or fluid pressure to build behind the retention device 125 to dislodge the retention device 125 and the gasket 105. The reduced size of the gasket 105, with respect to prior implementations, may enable contact between the entire downward-facing shoulder 132 of the connector 112 and the entire upward-facing shoulder 130 of the housing 110. The increased surface area contact between the housing 110 and the connector 112 at the interface between these components increases the strength, flexibility, or both of the assembly 100.

Figure 2:
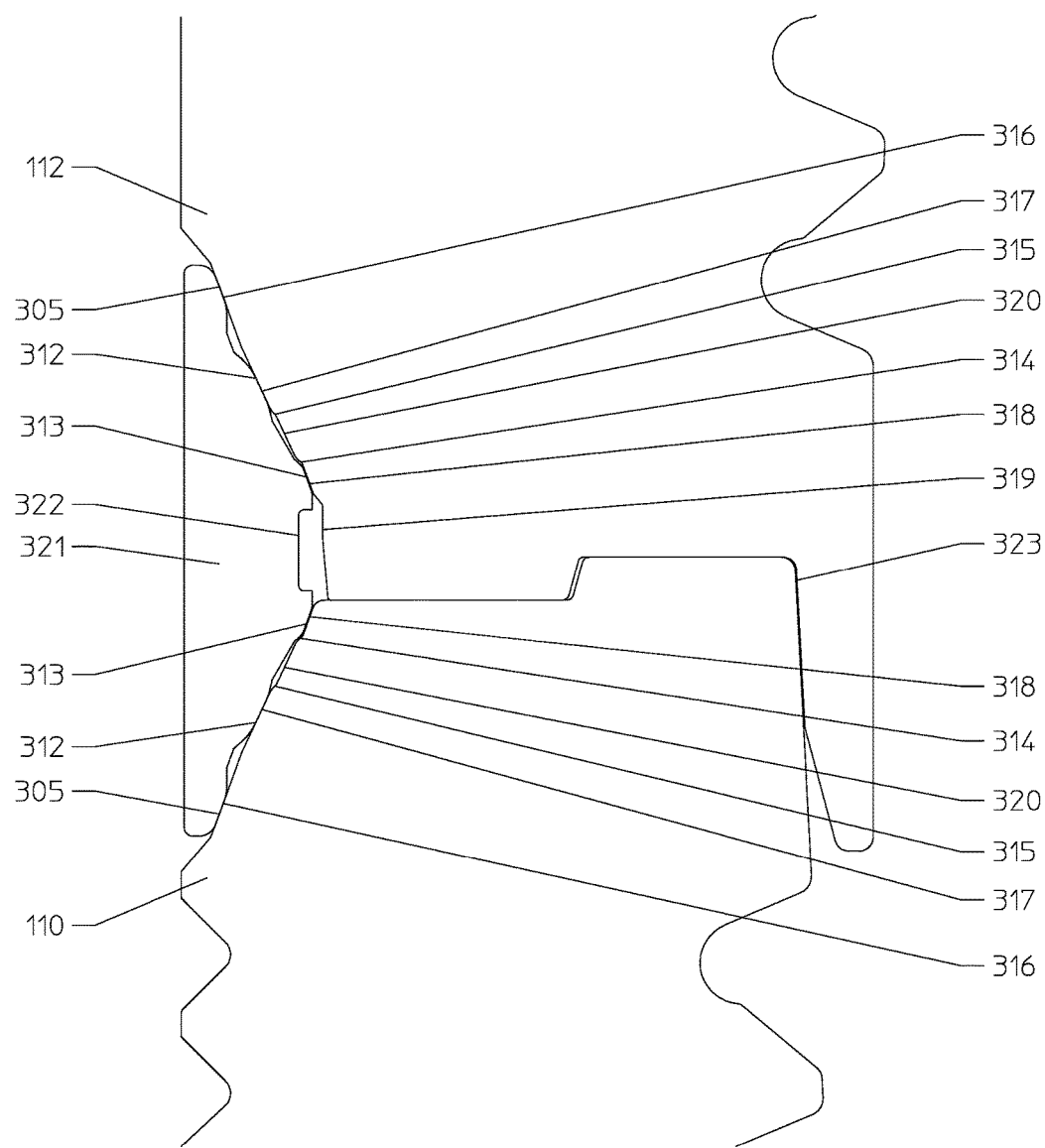
FIG. 2 is a side cross sectional view of an assembly comprising a housing, a connector, and a gasket, according to one or more aspects of the present disclosure.

In one or more embodiments, the conical surfaces of the tubular members may include multiple conical surfaces separated by steps, or transitions, between the conical surfaces. These steps may provide a visual indication to the operator for properly seating the gasket. Alternatively, the multiple sealing surfaces may act redundantly to prevent leaks in the event a single seal fails. Alternatively, one or more of these surfaces may act to help align the gasket instead of, or in addition to, acting as sealing surfaces. FIG. 2 illustrates such an embodiment. The housing 110 and the connector 112 may each include multiple surfaces 316, 317, 318, and 320 separated by steps 314 and 315 therebetween. Although four conical surfaces 316, 317, 318, and 320 are shown on each of the housing 110 and the connector 112, other numbers or arrangements of these conical surfaces may be utilized. The gasket 305 may include multiple conical sealing segments 311, 312, and 313 for sealing the gasket 305 against each of the housing 110 and the connector 112. For example, the conical sealing segments 312 of the gasket 305 may generally seal against the conical surfaces 317 of the housing 110 and connector 112, while the conical sealing segments 311 of the gasket 305 may generally seal against the conical surfaces 316 of the housing 110 and connector 112. Furthermore, conical sealing segments 313 of the gasket 305 may generally seal against the conical surfaces 318 of the housing 110 and connector 112. One or more of conical gasket surfaces 311, 312, and 313 may alternatively, or additionally, act to aid in alignment of the gasket 305 during installation of the gasket 305 and/or actuation of the connector. The connector 112 may include a straight vertical section 319 along its internal diameter. This straight vertical section 319, as shown, may be located between the conical surfaces 316, 317, 318, and 320 of the housing 110 and the connector 112 when the housing 110 and connector 112 are coupled together.

Figure 4:
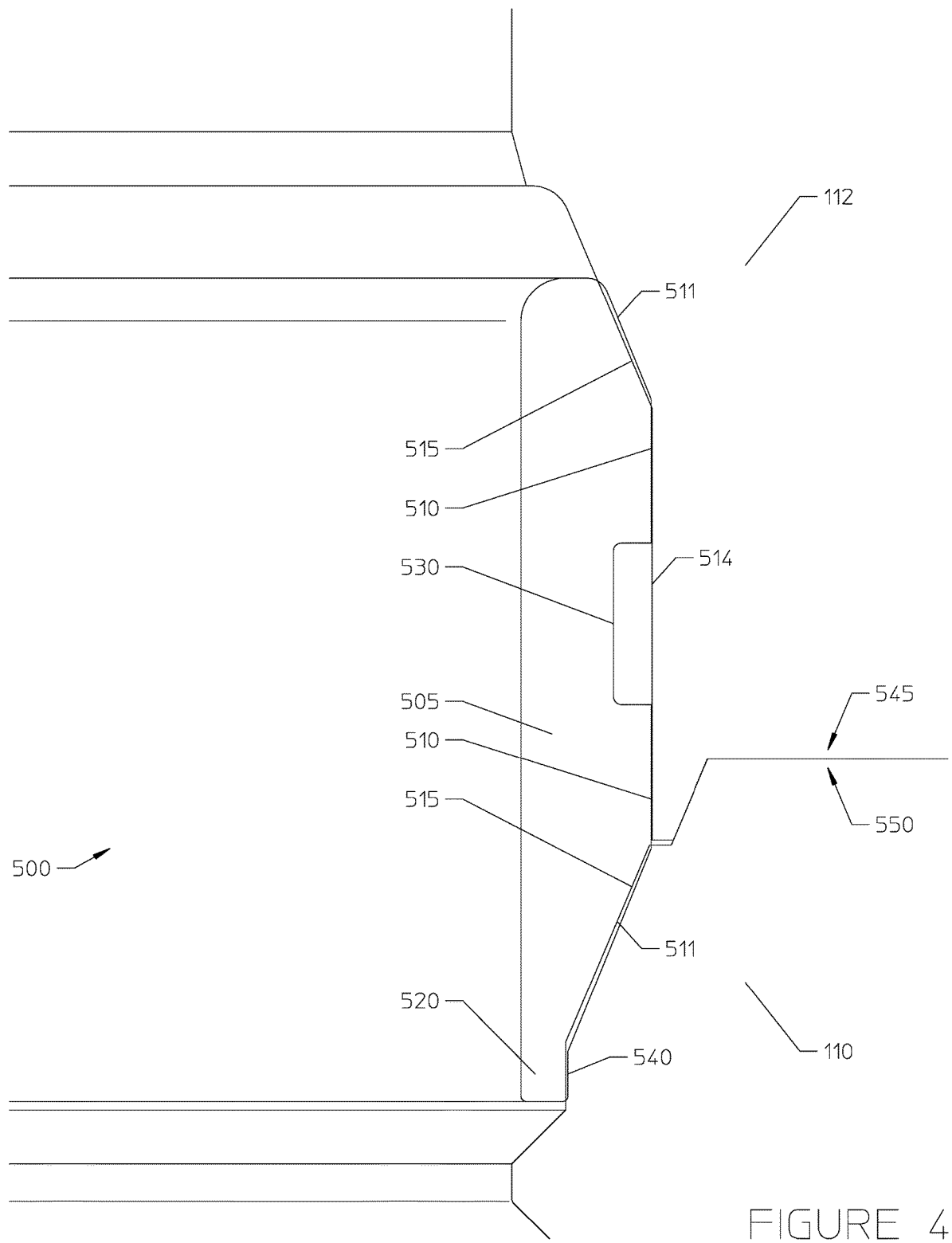
FIG. 4 is a side cross sectional view of an assembly comprising a housing, a connector, and a gasket, according to one or more aspects of the present disclosure.

The connector 112 may further include a tapered segment 321. The tapered segment 321 may aid in alignment of the connector 112 with respect to the housing 110. The tapered segment 321 of the connector 112 may interface with one or more of the conical gasket surfaces 311, 312, or 313 during actuation to aid in alignment of the gasket 305. In other embodiments, the connector 112 may not include the tapered segment but instead just the straight vertical section (e.g., as shown in FIG. 4 having vertical section 514). In such instances, the straight vertical section 514 of the connector 112 may extend all the way down and interface directly with one of the conical surfaces (e.g., 511) of the housing 110.

Furthermore, the gasket 305 may be designed in such a way to protect the sealing surfaces 320 of the housing 110 and connector 112 for use with other types of gaskets that can utilize these surfaces 320 for sealing. The gasket 305 is operable to increase surface area contact between the housing 110 and the connector 112 at the interface between the tubular members and to create a seal at said interface. The interface between the housing 110 and the connector 112 may be shaped with an alignment feature 323 designed to aid in alignment of the connector 112 with the housing 110 during installation of the connector 112 onto the housing 110. The alignment feature 323 may generally include a concave portion of the connector configured to be received over a complementary shaped convex portion of the housing 110. The alignment feature 323 may be specifically designed to ensure alignment of the connector 112 with the housing 110 prior to the gasket 305 being energized.

Figure 3:
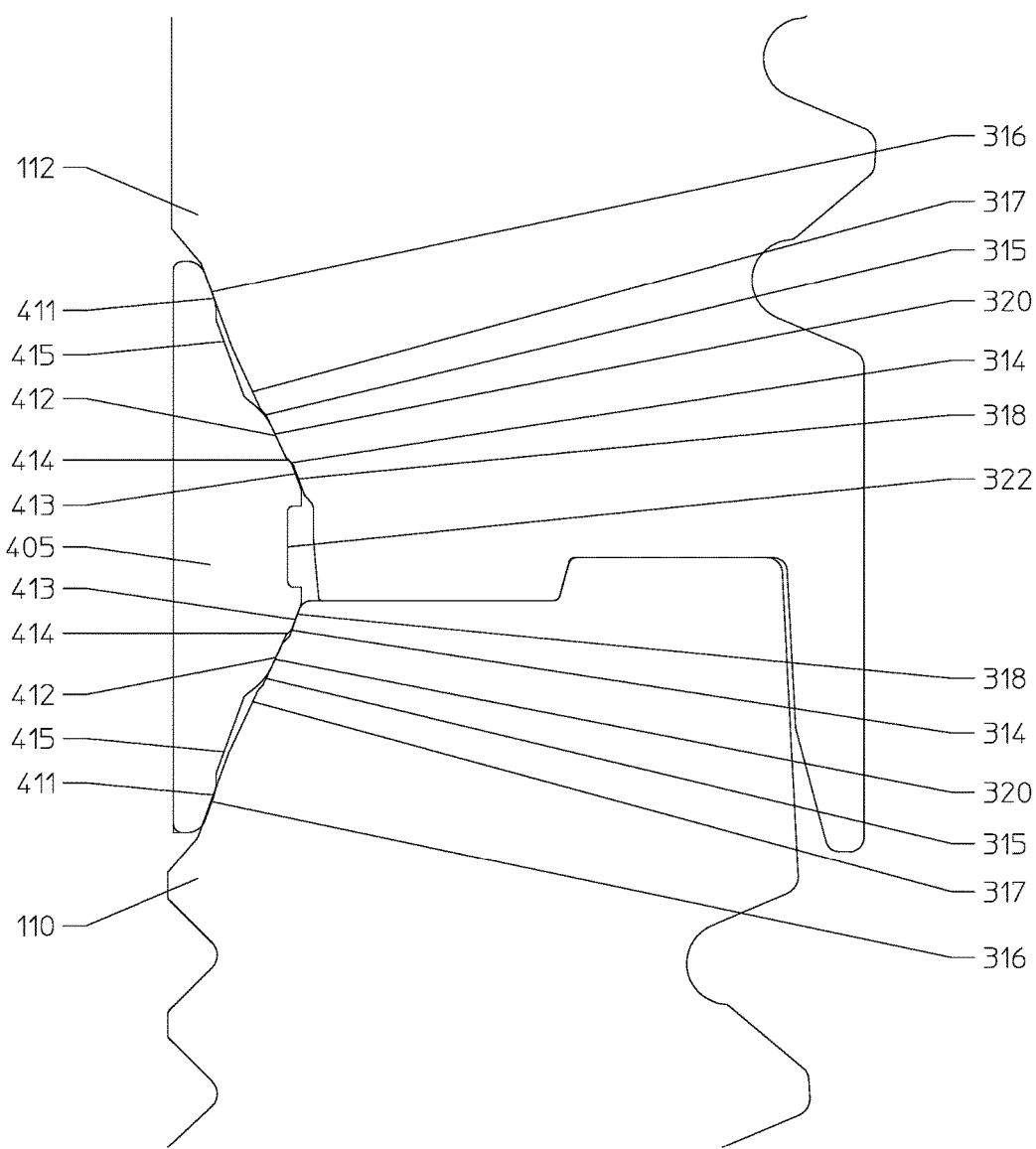
FIG. 3 is a side cross sectional view of an assembly comprising a housing, a connector, and a gasket, according to one or more aspects of the present disclosure.

FIG. 3 illustrates another embodiment of the housing, connector, and gasket of the present disclosure, which may increase the surface area contact between the housing 110 and the connector 112 at the interface between the two components. As shown, the housing 110 and connector 112 may each include similarly shaped surfaces 314, 315, 316, 317, 318, and 320 as those described above. Similar to the gasket 305 of FIG. 2, the gasket 405 of FIG. 3 may include multiple conical sealing segments 411, 412, 413 for sealing the gasket 405 against each of the housing 110 and the connector 112. For example, the conical sealing segments 412 of the gasket 405 may generally seal against the conical surfaces 320 of the housing 110 and connector 112, while the conical sealing segments 411 of the gasket 405 may generally seal against the conical surfaces 316 of the housing 110 and connector 112. Furthermore, conical sealing segments 413 of the gasket 405 may generally seal against the conical surfaces 318 of the housing 110 and connector 112. One or more of the conical gasket surfaces 411, 412, and 413 may alternatively, or additionally, act to aid in alignment of the gasket 405 during installation of the gasket 405 and/or actuation of the connector 112. Furthermore, the gasket 405 may be designed in such a way as to protect the sealing surfaces 317 of the housing 110 and connector 112 for use with other types of gaskets that may utilize the surface for sealing. The gasket 405 may further include a recess 430 located between the vertical sealing elements 410. The recess 430 may be operable to receive a retention device (not shown). The gasket 405 may also include additional recesses 415 formed between adjacent sets of conical sealing segments 411 and 412, as shown.

FIG. 4 illustrates yet another embodiment of the housing, connector, and gasket of the present disclosure. The housing 110 and the connector 112 may each include one or more conical surfaces 511. The connector 112 may include a straight vertical section 514 along its internal diameter. This straight vertical section 514, as shown, may be located between the conical sealing surfaces 511 of the housing 110 and the connector 112 when the housing 110 and connector 112 are coupled together. The straight vertical section 514 of the connector 112 may interface directly with the conical sealing surface 511 of the housing 110. Like the gasket 405 of FIG. 3, the gasket 505 of FIG. 4 may include conical sealing segments 515, to seal against the conical surfaces 511 of the housing 110 and connector 112 vertical sealing segments 510 to seal against the vertical section 514 of the connector 112, and a recess 530. The recess 530 may generally be located between the two vertical sealing segments 510, as shown. The recess 530 may be operable to receive a retention device (not shown). The gasket 505 may further include an extension 520 that may remain in contact with a vertical section 540 of the housing 110.

As shown in FIG. 4, the end of the connector 112 facing the housing 110 may include a concave portion 545, and the end of the housing 110 facing the connector 112 may include a complementary convex portion 550. The concave portion 545 of the connector 112 may be shaped to fit directly over and around the convex portion 550 of the housing 110. This may help with aligning the connector 112 to the housing 110 while the connection is being made. The concave/convex portions may also facilitate a larger overall surface area of connection between the ends of the housing 110 and the connector 112.

Figure 5:
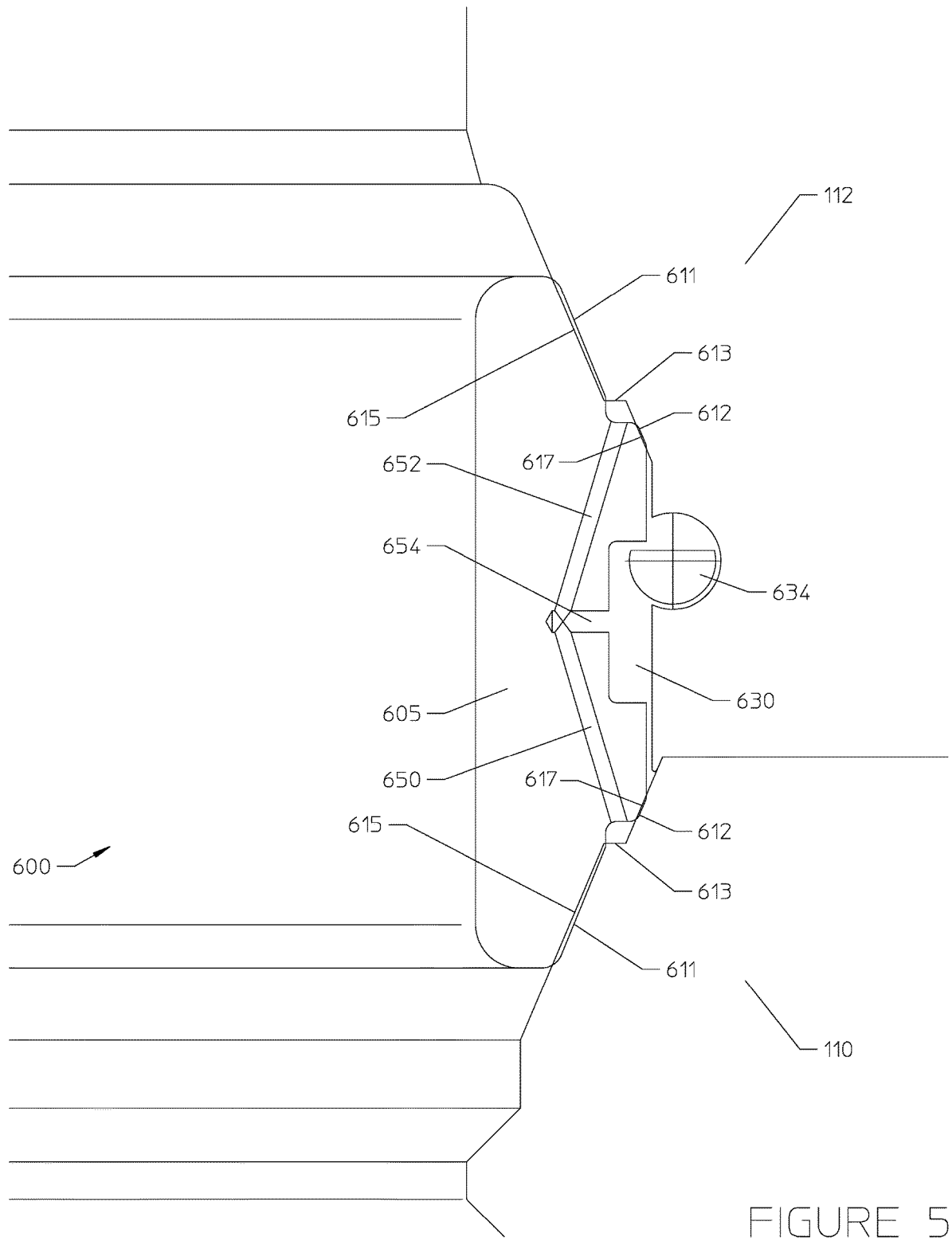
FIG. 5 is a side cross sectional view of an assembly comprising a housing, a connector, and a gasket, according to one or more aspects of the present disclosure.

FIG. 5 illustrates a further embodiment of the housing, connector, and gasket of the present invention. The housing 110 and the connector 112 may each include multiple conical surfaces 611, 612 separated by a step 613 therebetween. Although only two conical surfaces 611, 612 are shown on each of the housing 110 and the connector 112, other numbers or arrangements of these conical surfaces may be utilized. Like gasket 305 of FIG. 2, the gasket 605 of FIG. 5 may include multiple stepped sealing segments 615, 617 designed to interface directly with the corresponding conical surfaces 611, 612 of the housing 110 and connector 112. The gasket 605 may include a recess 603 formed therein between the opposing sets of conical sealing segments 615, 617. The recess 630 may be operable to receive a retention device 634. The retention device 634 may be mechanically, hydraulically, or pneumatically operated, and may be used to selectively maintain the position of the gasket 605 in position or to dislodge the gasket 605 so that it may be replaced. Example gasket retention assemblies that include such a retention device designed to interface with the recess 630 in the gasket 605 are described in greater detail below.

Figure 6:
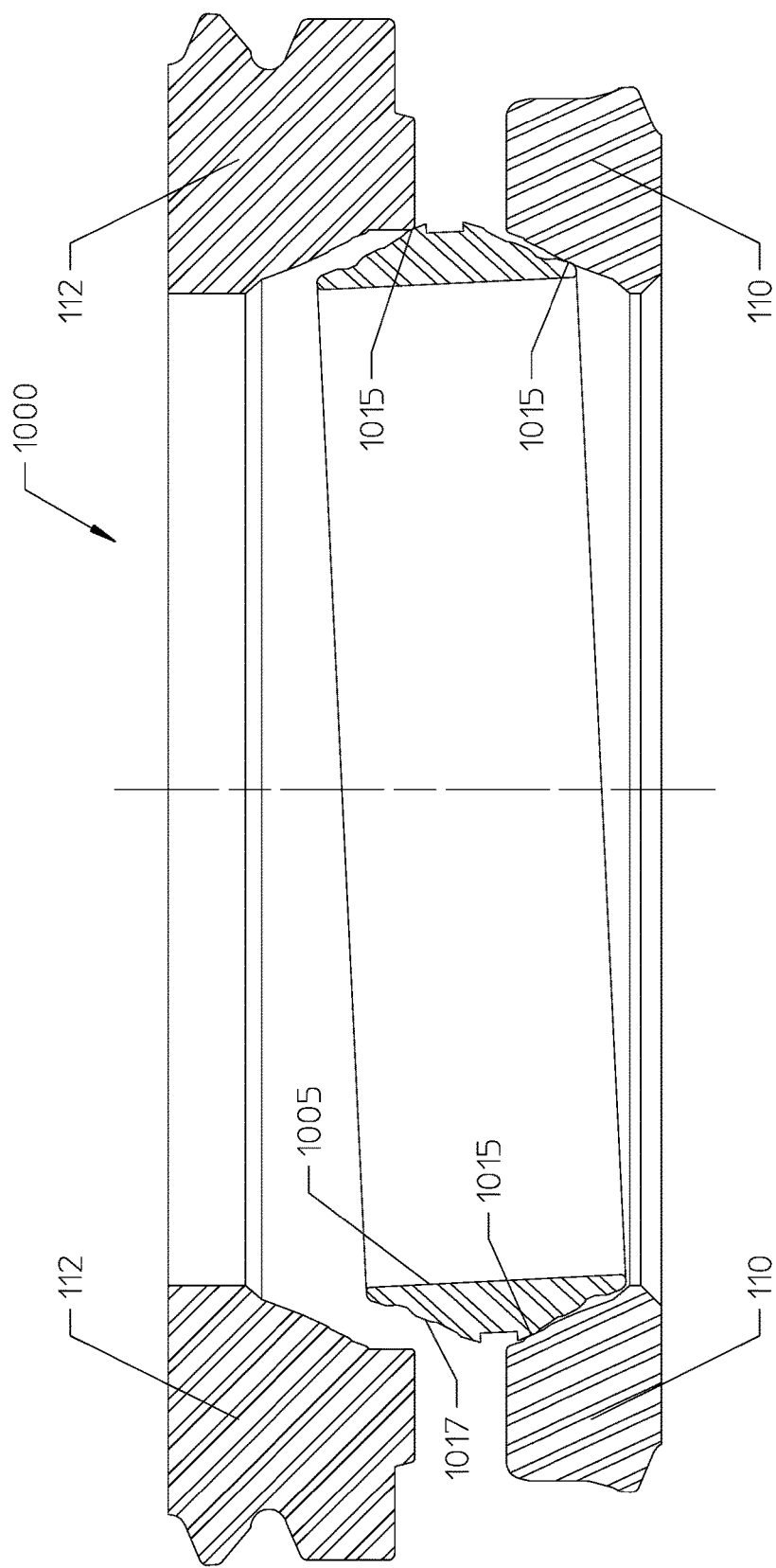
FIG. 6 is a side cross sectional view of a well assembly as a gasket moves into alignment and prior to contact between tubular members, according to one or more aspects of the present disclosure.
Figure 7:
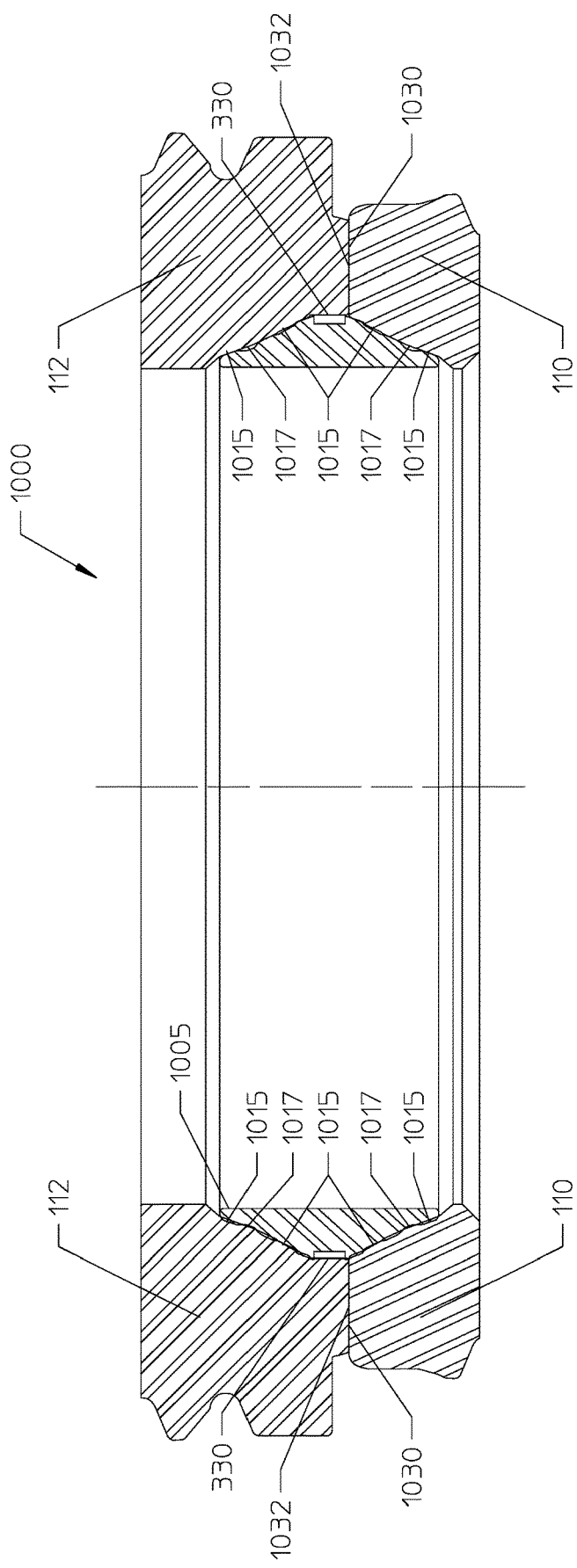
FIG. 7 is a side cross sectional view of a well assembly after a gasket has moved into alignment and tubular members contact one another, according to one or more aspects of the present disclosure.

FIGS. 6 and 7 illustrate aligning and sealing an interface of the housing 110 with the connector 112 using a representative gasket 1005 in accordance with aspects of the present disclosure. As shown in FIG. 7, the entire surface area of the shoulders 1030, 1032 making up the housing 110 and connector 112, respectively, are able to engage each other and thus bear much greater loading demands than existing connections.

In one or more embodiments, the tubular members (housing 110 and connector 112) may include multiple conical segments separated by one or more steps, or transitions, between conical segments and the gasket 1005 may similarly include multiple conical segments separated by one or more steps, or transitions. These steps may provide a visual indication to the operator for identifying the functionality of the given conical segment. Additionally, the steps may separate the conical segments by function, such that certain conical segments act as sealing surfaces while other conical segments act as aligning surfaces.

FIGS. 6 and 7 illustrate such an embodiment. The gasket 1005 may include a plurality of conical alignment segments 1015 and a plurality of conical sealing segments 1017 which may be separated by steps. The gasket 1005 is operable to increase surface area contact between the housing 110 and the connector 112 at the interface between these components and to create a seal at said interface. The alignment segments 1015 may enable alignment of the gasket 1005 when making initial contact with the tubular members 110, 112. The sealing segments 1017 of the gasket 1005 may only contact the conical segments of the tubular members 110, 112 after partially energizing the gasket 1005 (by mechanical, hydraulic, or any other similar means) and applying an axial load to both ends of the gasket 1005, as is done during latching of the connector 112 to the housing 110. The alignment segments 1015 of the gasket 1005 may be operable to prevent contact between the sealing segments 1017 of the gasket 1005 and the conical sealing segments of the tubular members 110, 112 during alignment, such that engagement of the sealing segments of the tubular members with the sealing segments 1017 of the gasket only occurs when the housing 110, connector 112, and gasket 1005 are axially aligned. In such an embodiment, the initial contact of the gasket 1005 with the housing 110 and the connector 112 occurs along the alignment segments 1015 of the gasket 1005. These alignment segments 1015 guide the gasket 1005 into place as the tubular members 110, 112 are brought together to create the assembly 1000.

By preventing oblique contact between the critical sealing segments 1017 of the gasket 1005 and the tubular members 110, 112, the sealing segments 1017 of the gasket 1005 may avoid wear until the assembly 1000 is ready to be sealed. The alignment segments 1015 may further minimize the sliding distance as the gasket 1005 is aligned. The gasket 1005 may further include a recess 330 that may be operable to receive a retention device (not shown).

FIG. 7 illustrates the assembly 1000 after the gasket 1005 has moved into alignment along alignment segments 1015 and the gasket 1005 has created a seal where the sealing segments 1017 contact the housing 110 and the connector 112. The shape of the gasket 1005 enables contact between the entire upward-facing shoulder 1030 of the housing and the entire downward-facing shoulder 1032 of the connector 112.

The steps of aligning, engaging, and sealing the housing 110 to the connector 112 are further shown in FIGS. 8A-C. As disclosed above, the net result is a housing-connector engagement that maximizes the load-bearing capabilities of the assembly 1000. The illustrated embodiment includes a gasket 905 that may feature mismatched angles on conical segments 915 and 917. The mismatched angles of the conical segments 915 and 917 may ensure that the sealing segments 917 do not sealingly engage the connector 112 and housing 110 until the gasket 905 is partially energized and precisely aligned within the tubular assembly. The angles of the alignment segments 915 may be less steep than the corresponding angles of the sealing segments 917 taken relative to the vertical axis. As a result, there will be less of a change of interference between the alignment segments 915 and the housing 110/connector 112 for a given axial stroke length of the connector 112 towards the housing 110. This mechanism may be used to allow initial contact to occur at the surfaces 915 of the gasket 905, but can result in a greater total interference on the sealing segments 917. Since interference is proportional to sealing contact stress, and therefor seal integrity, it is important to have greater interference on the sealing segments 917 than on the other segments 915. This prevents the sealing surface (i.e., sealing segments 917) of the gasket 905 from being the first surface to contact the housing/connector, which can result in scratching the sealing surface and, therefore, degraded performance of the seal.

In FIG. 8A, alignment segments 915 of the gasket 905, may come into contact with the housing 110 and the connector 112, while sealing segments 917 have not come into contact with the tubular members 110, 112, as described above. For example, if the gasket 905 is initially rotated relative to the tubular members, the alignment segments 915 of the gasket 905 may make first contact with the tubular members 110, 112 and facilitate corrective rotation to align the gasket 905. As the assembly 900 is brought into alignment, the sealing segments 917 of the gasket 905 may be brought into contact with the tubular members 110, 112 while the alignment segments 915 may remain in contact with tubular members 110, 112, as illustrated in FIG. 8B. The gasket 905 may create a seal where the gasket 905 contacts the tubular members 110, 112. The conical sealing segments 917 of the gasket 905 may be energized by drawing the tubular members 110, 112 together under high loads so as to radially and tangentially compress the gasket 905 to generate high contact stresses at the sealing segments 917. The high contact stresses provide a tight seal against high pressure fluid, such as oil or gas. In this embodiment, the alignment segments 915 may cease contact with tubular members 110, 112 while the sealing segments 917 remain in contact with the tubular members 110, 112. In other embodiments, alignment segments 915 may remain in contact during and after the seal is formed. In addition to sealing against fluid transported through the bore, the seal and connection provided by the gasket 905 may provide a load path for forces generated by bending and compressing the assembly. A gasket 905 comprising a slender ring may be flexible to withstand the load and compression of the bending moment applied by the connection between the tubular members 110, 112.

In one or more embodiments, the disclosed gasket (e.g., 105, 305, 405, 505, 605, 905, 1005) may include a thin corrosion resistant layer on the order of between 0.001" and 0.002" thick applied to the metal body of the gasket. The corrosion-resistant layer may be silver, tin, molybdenum di-sulfide, or a flouropolymer such as Xylan™. These materials provide adequate corrosion resistance and durability in high pressure and high temperature environments. They also provide reduced friction and protection against galling. The corrosion-resistant layer may be easier to apply to the entire gasket (e.g., 105, 305, 405, 505, 605, 905, 1005) during manufacture, but may also be applied subsequently.

The present disclosure may be useful for joining tubular members used in the hydrocarbon recovery industry, and is illustrated and explained in this context. It should be noted, however, that the invention can be applied more generally in other contexts and environments wherein first and second tubular members are to be sealingly joined, and possibly exposed to wide temperature and pressure ranges.

Having described the general use of a gasket with improved sealing capabilities and a tubular assembly that enables an increased surface area at the interfacing surfaces of tubular components, a gasket retention system that may be used with the tubular assembly will now be described.

Figure 9:
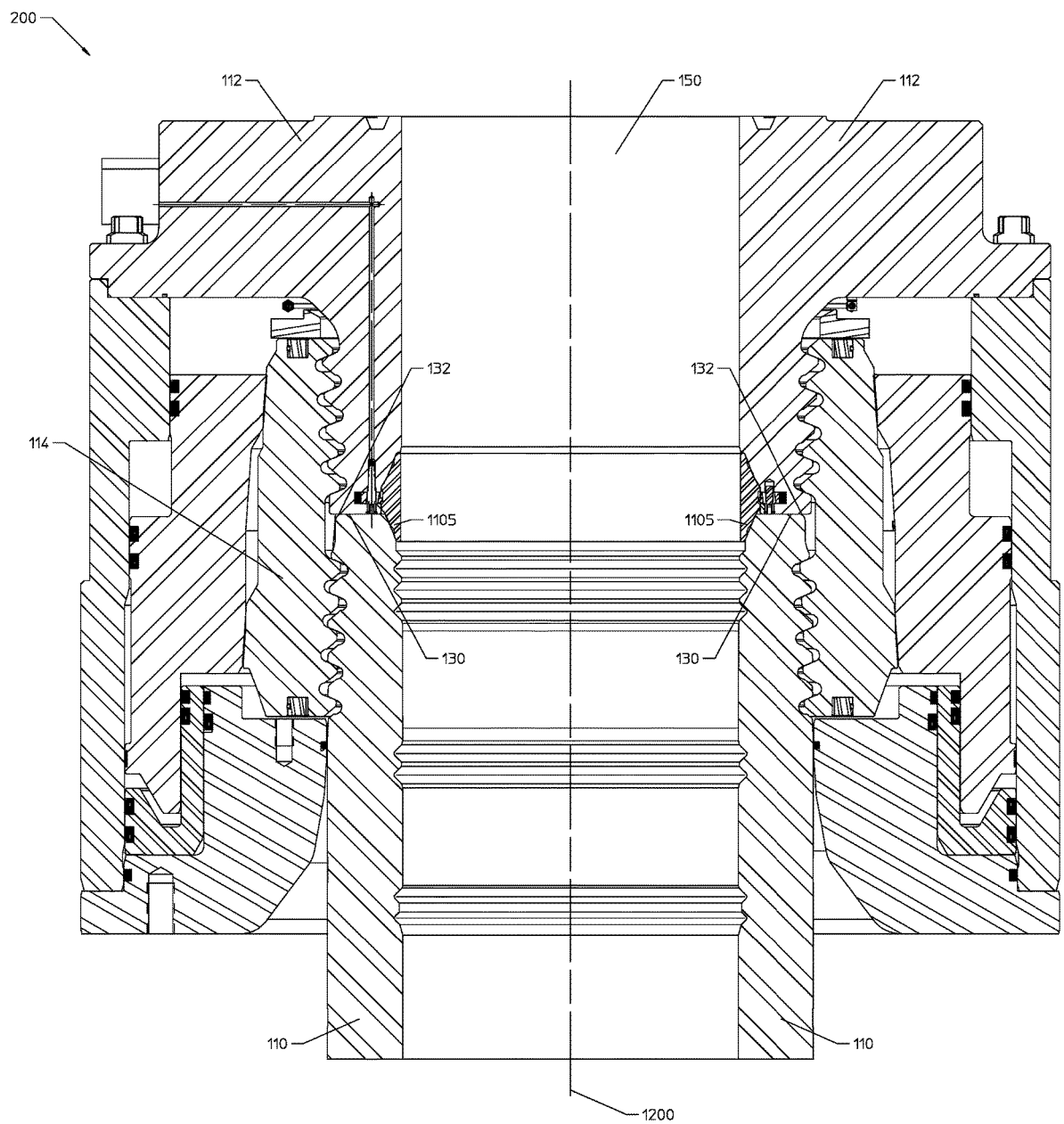
FIG. 9 is a side cross sectional view of a tubular assembly, according to one or more aspects of the present disclosure.

FIG. 9 illustrates an assembly 200 (e.g., wellhead assembly) including a tubular housing 110, a tubular connector 112, and a gasket 1105. A central bore 150 runs through each of the housing 110, the connector 112, and the gasket 1105. The tubular housing 110 and tubular connector 112 may include a subsea wellhead housing and a subsea wellhead connector, respectively. However, it should be noted that the disclosed gasket retention assembly may be similarly utilized in other contexts involving a tubular housing coupled to a tubular connector and sealed against the tubular connector via a gasket.

The assembly 200 having the housing 110 and the connector 112 is illustrated as being in a locked and sealed configuration. As illustrated, the housing 110 and connector 112 may be secured together via a locking ring 114. The locking ring 114 may surround the housing 110 and at least a main body of the connector 112. The gasket 1105 may include a conical upward facing surface and a conical downward facing surface. The gasket 1105 may generally create a seal when the conical upward facing surface of the gasket 1105 contacts a conical downward facing surface of the connector 112, and the conical downward facing surface of the gasket 1105 contacts a conical upward facing surface of the housing 110. The gasket 1105 may be self-aligning and relatively slender. The reduced size of the gasket 1105, compared to prior implementations that featured radially extending ribs, may enable contact between all (or almost all) of a downward facing shoulder 132 of the connector 112 and all (or almost all) of an upward facing shoulder 130 of the housing, as described at length above with reference to FIGS. 1-8.

The assembly 200 of FIG. 9 includes an improved gasket retention assembly 1100 that may be used to retain the gasket 1105 in a desired position relative to the connector 112. The gasket retention assembly 1100 may be self-energizing and enable hands free operation for selectively connecting or removing the gasket 1105 from the connector 112.

Figure 10:
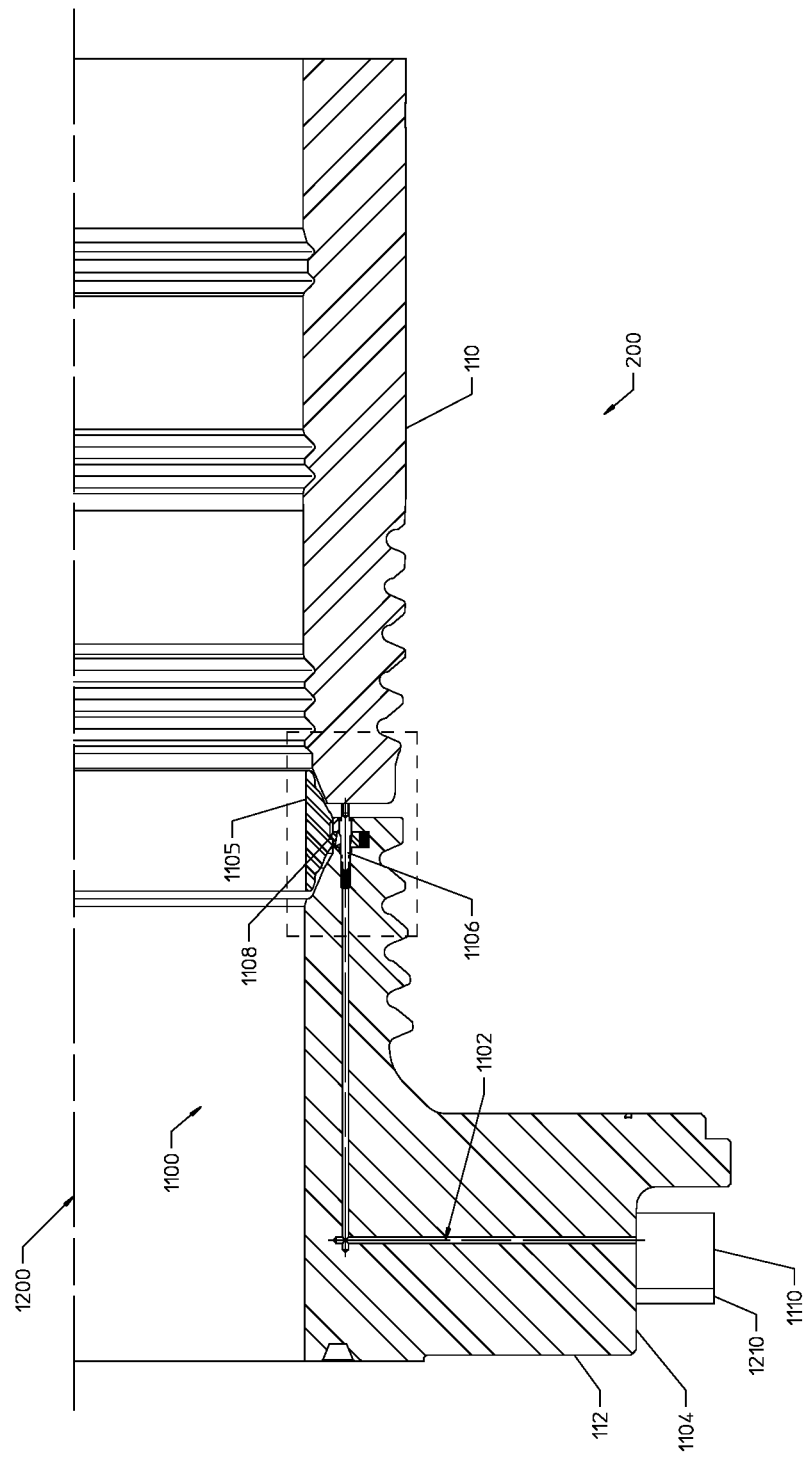
FIG. 10 is a side cross sectional view of a housing, connector, and associated gasket and gasket retaining assembly of the tubular assembly of FIG. 9, according to one or more aspects of the present disclosure.
Figure 11:
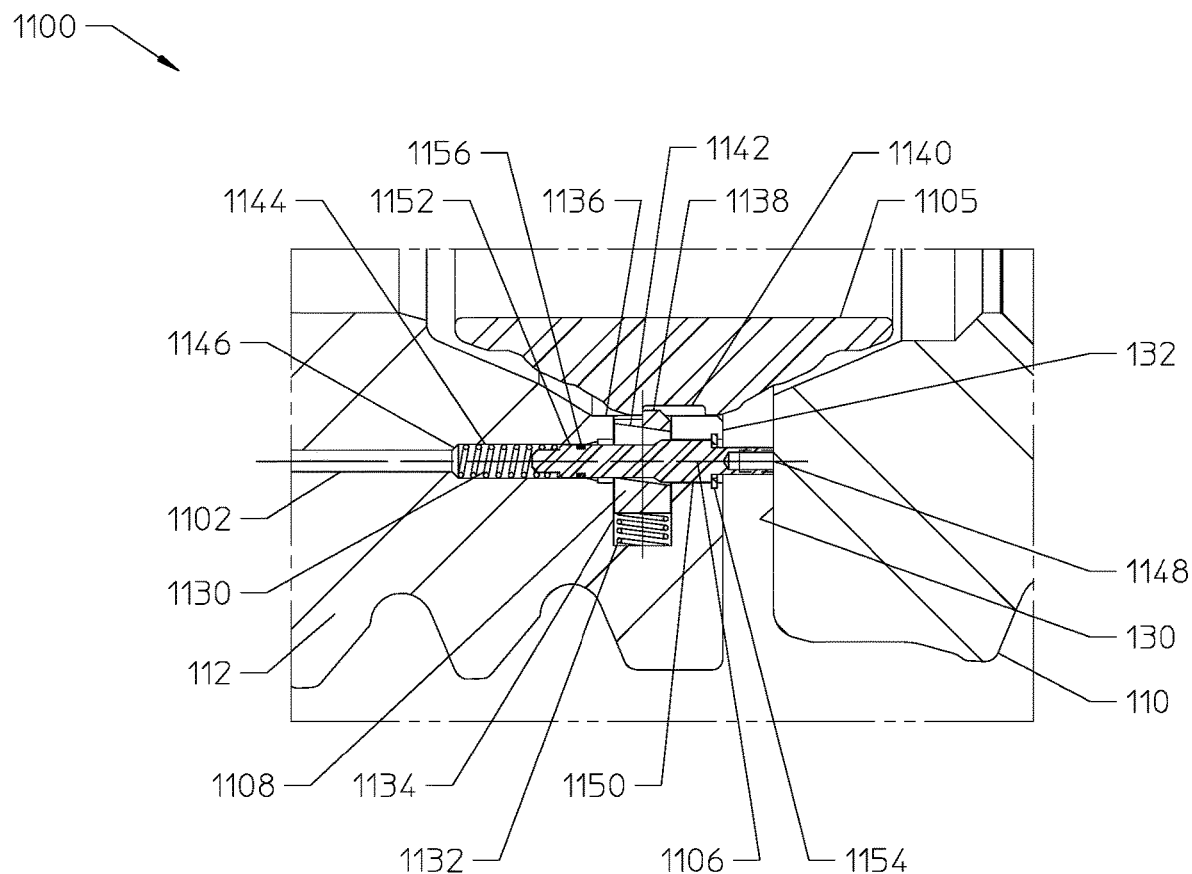
FIG. 11 is a close-up side cross sectional view of the gasket and gasket retaining assembly taken within the dashed lines of FIG. 10 in a landing configuration, according to one or more aspects of the present disclosure.
Figure 12:
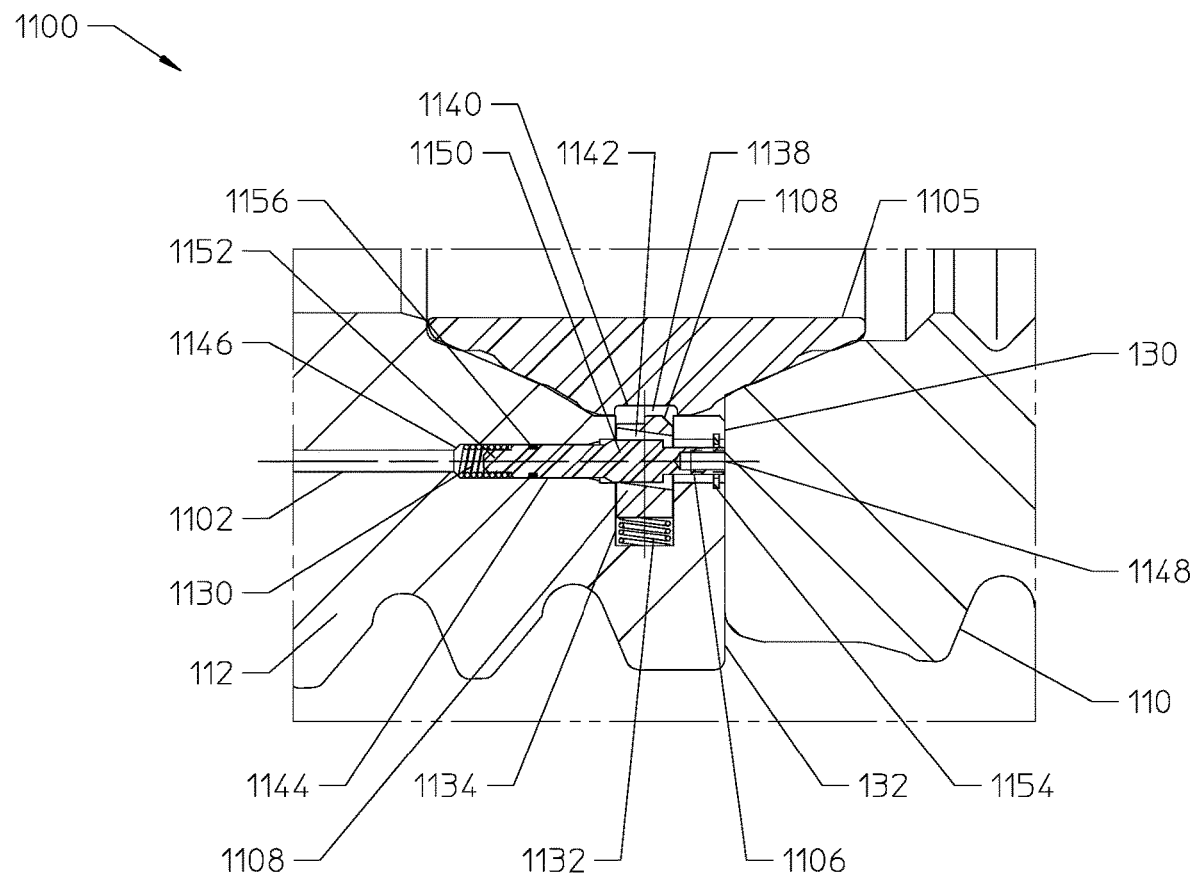
FIG. 12 is a close-up side cross sectional view of the gasket and gasket retaining assembly taken within the dashed lines of FIG. 10 in a landed configuration, according to one or more aspects of the present disclosure.

FIGS. 10-12 illustrate an embodiment of the disclosed gasket retention assembly 1100 that may be used to hold the gasket 1105 in a desired position within a larger tubular assembly 200. As shown in FIG. 10, the gasket retention assembly 1100 may include a port 1102 formed through the connector 112 and leading from an outer edge 1104 of the connector 112 at one end to a spring loaded plunger 1106 and a spring loaded retention mechanism 1108 at an opposite end. As shown, the gasket retention assembly 1100 may also include a closure mechanism 1110 disposed at the end of the port 1102 that terminates at the outer edge 1104 of the connector 112. The closure mechanism 1110 may include any type of device or assembly that may be used to selectively prevent a flow of fluid through the port 1102. For example, the closure mechanism 1110 may generally enable an end of the port 1102 to be selectively closed off or opened depending on a position or actuation of the closure mechanism 1110, thereby preventing or allowing fluid flow through the port 1102. The closure mechanism 1110 may include a valve fluidly coupled to the port 1102, a check valve positioned along the port 1102, or a separate plug that may be inserted into an end of the port 1102 to close the port 1102 or removed from the port 1102 to open the port 1102.

The closure mechanism 1110 may be accessible to a remote operated vehicle (ROV) or other component located outside the tubular assembly 200. When the closure mechanism 1110 is positioned or actuated such that the port 1102 is open to fluid flow, (e.g., valve is open, no plug in the port, etc.), the closure mechanism 1110 may allow venting of fluid/pressure from the port 1102, or may allow pressure inputs from an external device (e.g., ROV) to flow into the port 1102. When the closure mechanism 1110 is positioned or actuated to prevent fluid flow through the port 1102 (e.g., valve is closed, plug is placed in the port), the closure mechanism 1110 may prevent fluid/pressure flow between the port 1102 and external components. In some instances, the closure mechanism 1110 may include a closed valve system with a fluid storage mechanism disposed therein, such that the port 1102 may be fluidically coupled to the fluid storage mechanism when the valve is open.

The retention mechanism 1108 may directly engage with the gasket 1105 to effectively lock the gasket 1105 in position against the connector 112. The plunger 1106 may be used to selectively engage or disengage the retention mechanism 1108 from the gasket 1105 to enable retrieval of the gasket 1105 from the connector 112 as desired. In some instances, the closure mechanism 1110 may help to hydraulically control the position of the plunger 1106 to facilitate engagement or disengagement of the retention mechanism 1108 from the gasket 1105. Various different arrangements of the retention mechanism 1108, plunger 1106, and/or closure mechanism 1110 may be utilized to selectively engage and disengage the retention mechanism 1108 from the gasket 1105 throughout operation of the gasket retention assembly 1100. Different examples of functional arrangements of the gasket retention assembly 1100 will now be described in greater detail.

FIGS. 11 and 12 show a close up view of parts of the gasket retention assembly 1100 shown in FIG. 10. FIG. 11 shows the assembly 1100 in a landing position prior to the connector 112 landing on the housing 110 and being secured to the housing 110 (e.g., via a lock ring). FIG. 12 shows the assembly 1100 in a landed position after the connector 112 has successfully landed on the housing 110 such that the gasket 1105 is sealing the space between the connector 112 and the housing 110.

As illustrated, the gasket retention assembly 1100 includes the plunger 1106 with a corresponding spring 1130 and the retention mechanism 1108 with a corresponding spring 1132. The retention mechanism 1108 is disposed at least partially within a recess 1134 formed in the connector 112. The recess 1134 in the connector 112 is generally formed in a radial direction with respect to a longitudinal axis (e.g., 1200 of FIG. 9) of the bore (e.g., 150 of FIG. 9) through the tubular assembly (e.g., 200 of FIG. 9). As shown, the recess 1134 generally extends through an inner diameter 1136 of the connector 112. The retention mechanism 1108 and its corresponding spring 1132 are held within the recess 1134 formed in the connector 112. A portion of the plunger 1106 also passes through the recess 1134 as well.

The retention mechanism 1108 may include an engagement feature 1138 such as a shoulder, latch, or similar component, designed to engage with a complementary profile 1140 (e.g., recess, shoulder, latch, etc.) on a radially outer diameter of the gasket 1105. The engagement features 1138 is disposed on an end of the retention mechanism 1108 extending in a radial direction from the recess 1134 toward the gasket 1105. At an opposite end, the retention mechanism 1108 is coupled to the spring 1132. The spring 1132 may abut an edge of the recess 1134 within the connector 112 such that the spring 1132 biases the retention mechanism 1108 in a radially inward direction toward the gasket 1105.

The retention mechanism 1108 includes a passage 1142 formed therethrough. The passage 1142 enables the spring loaded plunger 1106 to pass entirely through the retention mechanism 1108 and, consequently, through the recess 1134 in the connector 112. As illustrated, the plunger 1106 may generally extend in a direction that is parallel to the longitudinal axis (e.g., 1200 of FIG. 9) of the bore (e.g., 150 of FIG. 9) through the tubular assembly (e.g., 200 of FIG. 9). As such, the spring loaded plunger 1106 and the spring loaded retention mechanism 1108 are positioned perpendicular to each other, and they are positioned with respect to each other so that the plunger 1106 extends at least partially through the passage 1142 in the retention mechanism 1108. As illustrated, the passage 1142 may include sloped walls.

The plunger 1106 is disposed at least partially through another recess 1144 formed in the connector 112. The recess 1144 in the connector 112 is generally formed in a longitudinal direction that is parallel to the longitudinal axis (e.g., 1200 of FIG. 9) of the bore (e.g., 150 of FIG. 9) through the tubular assembly (e.g., 200 of FIG. 9). As shown, the recess 1144 generally extends through the downward facing shoulder 132 of the connector 112. The recess 1144 intersects the radially oriented recess 1134. The recess 1144 may form a portion of the port 1102 extending through the connector 112. The recess 1144 may have a slightly larger diameter than the rest of the port 1102, so as to provide a shoulder 1146 for holding the spring 1130 in place.

The plunger 1106 may include a contact end 1148 that extends from the downward facing shoulder 132 of the connector 112 in a longitudinal direction toward the upward facing shoulder 130 of the housing 110. The contact end 1148 may make first contact with the upward facing shoulder 130 of the housing 110 prior to the downward facing shoulder 132 of the connector 112 making contact with the upward facing shoulder 130 of the housing 110. At an opposite end of the plunger 1106 from the contact end 1148, the plunger 1106 is coupled to the spring 1130. The spring 1130 may abut the shoulder 1146 at the edge of the recess 1144 such that the spring 1130 biases the plunger 1106 in a longitudinally downward direction toward the upward facing shoulder 130 of the housing 110.

The plunger 1106 may include a midsection 1150 disposed adjacent the contact end 1148 along the length of the plunger 1106. The plunger 1106 may include a tail portion 1152 disposed adjacent the midsection 1150 along the length of the plunger 1106, such that the midsection 1150 is located between the contact end 1148 and the tail portion 1152. As illustrated, the midsection 1150 of the plunger 1106 may have a larger diameter than both the contact end 1148 and the tail portion 1152 of the plunger 1106. Part of the recess 1144 may be sized to accommodate the larger diameter of the midsection 1150, while other parts of the recess (e.g., at the spring or "tail" end) may be sized to accommodate only up to the diameter of the tail portion 1152 of the plunger 1106, and not the midsection 1150. The larger diameter portion of the recess 1144 may extend only from one or both sides of the other recess 1134.

A plunger retainer ring 1154 may be positioned within the recess 1144 at a position proximate the downward facing shoulder 132. The plunger retainer ring 1154 may help maintain the plunger 1106 within the recess 1144 during the landing process, as the midsection 1150 with the larger diameter is held in place by the retainer ring 1154.

One or more O-rings 1156 or other seal elements may be positioned about the plunger 1106 to seal an annular space between the plunger 1106 and the connector 112. The one or more O-rings 1156 generally provide a fluidic seal that keeps fluid and pressure that is present within the port 1102 from flowing beyond the plunger 1106. As illustrated, the one or more 0-rings 1156 may be positioned about the tail portion 1152 of the plunger 1106.

In the landing position of FIG. 11, the gasket 1105 is locked to the connector 112 via the gasket retention assembly 1100. Specifically, the engagement feature 1138 (i.e., shoulder) of the retention mechanism 1108 is engaged with the corresponding profile 1140 on the gasket 1105 to hold the gasket 1105 against the connector 112. The spring 1132 keeps the retention mechanism 1108 biased outward to maintain the connection with the gasket 1105, and the spring 1130 biases the plunger 1106 toward the upward facing shoulder 130 of the housing 110 such that the contact end 1148 of the plunger 1106 extends outside of the connector 112. In arrangements where a valve or other closure mechanism 1110 is present, the valve may be held in an open position during landing of the connector 112 to allow fluid in the port 1102 to vent.

In the landed position of FIG. 12, the downward facing shoulder 132 of the connector 112 is brought into contact with the upward facing shoulder 130 of the housing 110. However, during the landing process, the contact end 1148 of the plunger 1106 may contact the upward facing shoulder 130 first. The upward facing shoulder 130 may transmit a reaction force in an upward direction to the contact end 1148 of the plunger 1106 as the connector 112 continues moving downward. The force from the upward facing shoulder 130 may press the plunger 1106 upward, compressing the spring 1130, until the entire plunger 1106 is positioned within the recess 1144 as shown in FIG. 12.

As the plunger 1106 is moved further into the connector 112, the radially large midsection 1150 of the plunger 1106 may move from a position proximate the plunger retainer ring 1154 to a position generally in line with the recess 1134. Due to the slanted walls of the passage 1142 formed through the retention mechanism 1108, a leading edge of the plunger midsection 1150 may contact the slanted wall on one side (e.g., radially outer side) of the passage 1142 as the plunger 1106 moves. The plunger 1106 may transmit a force in the longitudinal direction to the slanted wall of the passage 1142, and this force may push the retention mechanism 1108 in a radially outward direction since the retention mechanism 1108 is bound by the radially oriented recess 1134. Moving the plunger 1106 and, consequently, the retention mechanism 1108 in this way may withdraw the retention mechanism 1108 mostly or fully into the recess 1134 such that the retention mechanism 1108 is no longer in engagement with the gasket 1105. In the landed position of FIG. 12, the gasket 1105 is held between the slanted surfaces of the tubular housing 110 and connector 112. As shown, the gasket 1105 may no longer be held against the connector 112 via the gasket retention assembly 1100 when the gasket 1105 is in this landed position.

Turning back to FIG. 9, the cross section of the tubular assembly 200 shows the gasket retention assembly 1100 on one side of the connector 112 and not the other. It should be noted that the disclosed tubular assembly 200 may include multiple gasket retention assemblies 1100 (e.g., 2, 3, 4, 5, 6, 7, 8, or more) having respective ports, plungers, and retention mechanisms disposed within the connector 112. The multiple gasket retention assemblies 1100 may be located at different circumferential positions within the connector 112. The locations of the gasket retention assemblies 1100 may be spaced equidistant from each other circumferentially about the longitudinal axis 1200 of the bore 150.

In other embodiments, the tubular assembly 200 may feature just one gasket retention assembly 1100 having a port, plunger, and retention mechanism. In this case, as shown in FIG. 9, the tubular assembly 200 may include one or more additional retention features 1202 disposed within one or more recesses of the connector 112. For example, a retention feature 1202 may be disposed within the connector 112 on an opposite side from the gasket retention assembly 1100. However, similar retention features 1202 may be disposed at additional or alternative circumferential locations within the connector 112.

The retention feature(s) 1202 may include similar components as those used in the gasket retention assembly 1100, but without including a port or closure mechanism. Specifically, the retention feature(s) 1202 may each include a similar spring-loaded plunger and spring-loaded retention mechanism positioned within corresponding recesses formed in the connector. These components of the retention feature 1202 may be shaped, arranged, and designed to function as discussed in detail above with reference to the plunger 1106 and retention mechanism 1108 of FIGS. 10-12. In other instances, the retention feature(s) may include a pin mechanism, as shown. The retention feature(s) 1202 may press against the gasket 1105 from one or more different circumferential positions than the gasket retention assembly 1100 to help hold the gasket 1105 in place against the connector 112 during landing operations. Upon landing the connector 112, the retention feature(s), similar to the gasket retention assembly 1100, may be automatically deactivated via the interaction of the spring loaded plunger and retention mechanism to release the gasket 1105 from the connector 112.

The disclosed gasket retention assembly 1100 has a very small footprint within the overall tubular assembly 200. For example, the recess 1144 formed through the connector 112 is much smaller than recesses formed in existing connectors/housings to facilitate gasket retention. The recess 1144 that extends through the shoulder 132 of the connector 112 may be formed via drilled holes, instead of via large milled slots as is current practice. This reduced recess size means that a larger surface area of the downward facing shoulder 132 is able to contact the upward facing shoulder 130 of the housing 110 when the connector 112 is landed, thereby increasing the capacity of the housing/connector seal.

The disclosed gasket retention assembly 1100 also enables hands free or hydraulic operation for retrieving/releasing the gasket 1105 relative to the connector 112. For example, in the gasket retention assembly 1100 of FIGS. 10-12, no actions are required to land or retrieve the gasket 1105 with the connector 112. The closure mechanism 1110 may be positioned or actuated such that the port 1102 remains open to fluid flow during both landing and retrieval of the connector 112 so as to vent the fluid/pressure from the port 1102. As a result of this venting of the port 1102, the plunger 1106 is able to move up and down freely.

As described above, during landing, the housing 110 may push against the plunger 1106, which can move up since the port 1102 is vented. This movement of the plunger 1106 disengages the retention mechanism 1108 from the gasket 1105. Similarly, to retrieve the connector 112 and gasket 1105 together, the connector 112 may be unlocked from the housing 110 and picked up. As the connector 112 is lifted, the spring 1130 biases the plunger 1106 back to its original position extending from the edge of the connector 112. The plunger 1106 is able to move this direction due to venting of the port 1102. As the plunger 1106 moves back downward, the midsection 1150 of the plunger 1106 moves away from the passage 1142 such that the plunger 1106 is no longer pushing the retention mechanism 1108 toward the spring 1132. The spring 1132 biases the retention mechanism 1108 back toward the gasket 1105 such that the engagement feature 1138 of the retention mechanism 1108 re-engages the gasket 1105. As a result, the connector 112 may be reconnected to the gasket 1105 such that the gasket 1105 is retrieved with the connector 112 automatically during lifting of the connector 112. This retrieval of the gasket 1105 may be performed without the use of any ROV or hydraulic control operations.

At other times, it may be desirable to release the gasket 1105 from the connector 112. For example, it may be desirable to release the gasket 1105 from the connector 112 so that the gasket 1105 can be removed and replaced via an ROV. Releasing the gasket 1105 from the gasket retention assembly 1100 of FIGS. 10-12 involves first positioning or actuating the closure mechanism such that the port 1102 is closed to fluid flow therethrough, unlocking the connector 112 from the housing 110, and then picking up the connector 112 from the housing 110.

Positioning or actuating the closure mechanism 1110 to prevent fluid flow through the port 1102 traps the fluid above the plunger 1106 (e.g., forming a pressure trap), thereby causing the pressure within the port 1102 to remain constant. This prevents the plunger 1106 from moving back downward in response to the force from the spring 1130 while the connector 112 is being lifted. As a result, the plunger 1106 may stay in the same longitudinal position within the recess 1144 as the connector 112 is lifted. Similarly, the retention mechanism 1108 is held in the same position (i.e., disengaged from the gasket profile 1140) by the stationary plunger 1106.

After unlocking the connector 112 from the housing 110 (e.g., via the locking ring 114), the connector 112 may be lifted away from the housing 110 while the gasket retention device 1100 is in the closed configuration. With the closure mechanism 1110 closing off fluid flow through the port 1102, the retention mechanism 1108 may be unable to reconnect to the gasket profile 1140 during this movement of the connector 112. As a result, the gasket 1105 is no longer attached to the connector 112 and instead remains in its landed position against the housing 110. At this point, the gasket 1105 may be removed from the wellhead 110 via an ROV and traded out for another gasket 1105 via the same or a different ROV operating subsea. The connector 112 may then be landed back on the wellhead 110. To re-engage the gasket retention assembly 1100 with the new gasket 1105, the closure mechanism 1110 is opened again to allow fluid flow through the port 1102 and release the plunger 1106. That way, the next time the connector 112 is removed, the gasket retention assembly 1100 will be re-energized to engage the gasket profile 1140 and retrieve the gasket 1105.

The process of opening and closing the closure mechanism 1110 may be performed by an ROV that is controlled from the surface. The connector 112 may include an ROV interface 1210 as illustrated in FIG. 10, and the interface 1210 may provide one or more connections between an outside ROV stabbing into the interface 1210 and the closure mechanism (e.g., valve) 1110. The ROV may stab into the interface 1210 and output a control signal (e.g., hydraulic, electric, pneumatic) to the valve 1110 designed to actuate a valve or physically place a plug in the port 1102 to actuate the closure mechanism 1110 between the open and closed positions.

In addition, the interface 1210 may in some instances provide a direct fluid connection between an outside ROV stabbing into the interface 1210 and the port 1102. For example, an ROV may be able to stab into the interface 1210 and communicate pressurized fluid directly into the port 1102 when the closure mechanism 1110 is not positioned actuated to close the port 1102. That way, the ROV may communicate pressurized fluid into the port 1102 to help push the plunger 1106 down. This may be particularly useful in the event that the plunger 1106 becomes stuck or the spring 1130 is ineffective at pushing the plunger 1106 back down while the connector 112 is lifted off the housing 110.

Figure 13:
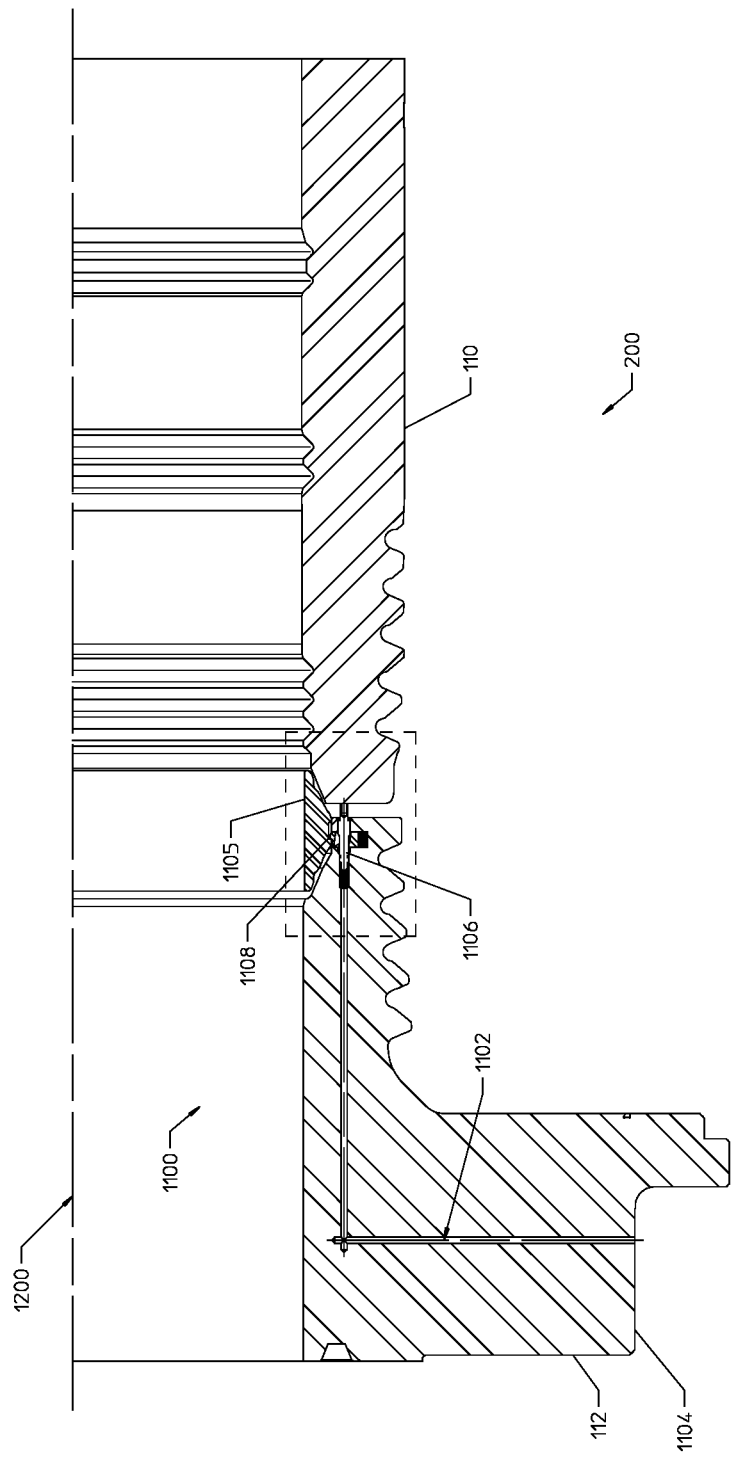
FIG. 13 is a side cross sectional view of a housing, connector, and associated gasket and gasket retaining assembly of a tubular assembly, according to one or more aspects of the present disclosure.

The gasket retention assembly 1100 of FIGS. 10-12 includes a closure mechanism 1110. However, other embodiments of the disclosed gasket retention assembly 1100 may not include any sort of valve, plug, or other closure mechanism on the connector 112. For example, FIG. 13 illustrates a similar gasket retention assembly 1100 where the pressure within the assembly is simply vented to the outside of the connector 112 via the port 1102. Venting pressure through the port 1102 may allow the plunger 1106 to move up and down freely, as described at length above. That way, the retention mechanism 1108 is always acting to retain the gasket 1105 within the connector 112 during movement of the connector 112. In some embodiments, the gasket retention mechanism 1100 may be designed in such a way as to allow the plunger 1106 and retention mechanism 1108 to release the gasket 1105 from the connector 112 in response to pressurized fluid communicated into the port 1102 (e.g., from an ROV).

Figure 14:
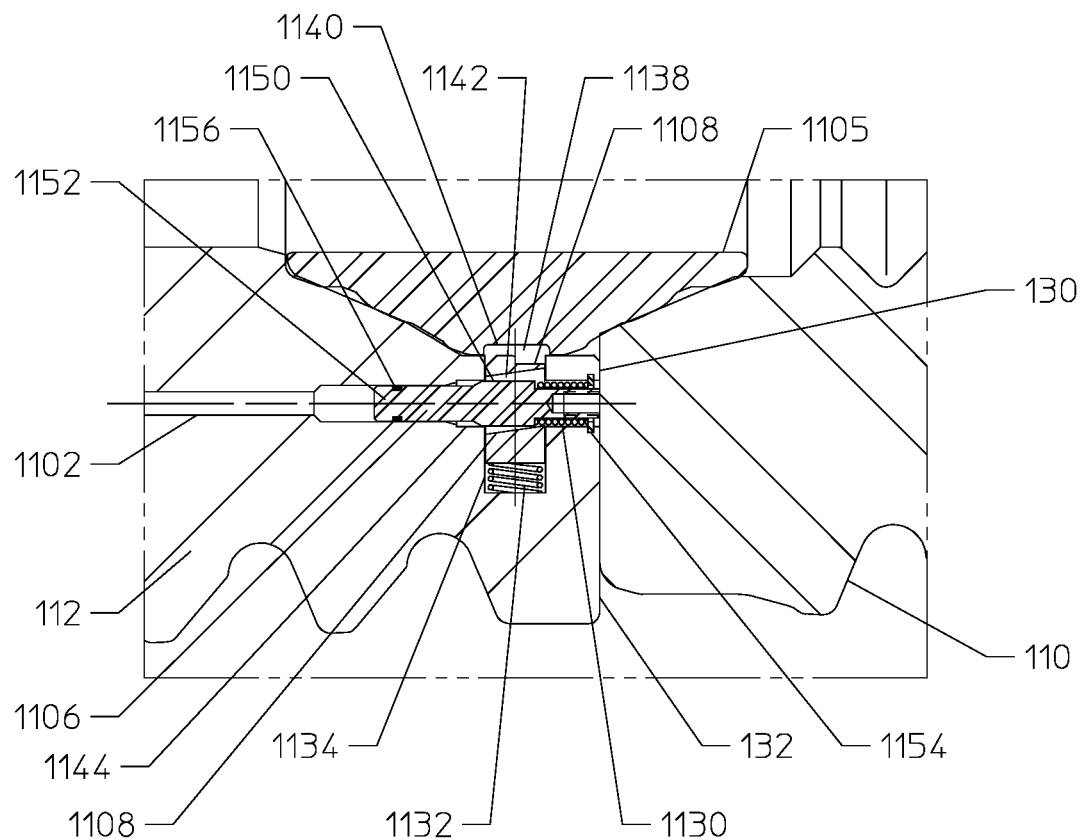
FIG. 14 is a close-up side cross sectional view of a gasket and gasket retaining assembly, according to one or more aspects of the present disclosure.

In another embodiment of the tubular assembly 200, the gasket retention mechanism 1100 may be designed with a reverse arrangement of the plunger 1106 and retention mechanism 1108 from the arrangement described above with reference to FIGS. 11 and 12. FIG. 14 illustrates a close up version of one such gasket retention mechanism 1100. All the elements of the gasket retention assembly 1100 may be the same as those shown and described with reference to FIGS. 11 and 12, except for the plunger 1106, spring 1130, and retention mechanism 1108. In this case, the spring 1130 may be located at the downward longitudinal end of the recess 1144 (e.g., positioned against the retainer ring 1154), such that the plunger 1106 is located within the recess 1144 at a position above the spring 1130. In the retention mechanism 1108 of FIG. 14, the slanted walls of the passage 1142 may be slanted in a different direction than those of the previously described example. Specifically, instead of the walls of the passage 1142 slanting in a generally upward and radially inward direction (as shown in FIGS. 11 and 12), the walls of the passage 1142 in FIG. 14 may slant in a generally upward and radially outward direction.

As a result of the different shape of the retention mechanism 1108 in FIG. 14, the gasket retention assembly 1100 may operate differently from the assembly described above with reference to FIGS. 11 and 12. In the gasket retention assembly 1100 of FIG. 14, the spring 1130 may bias the plunger in an upward direction within the recess 1144 such that the midsection 1150 of the plunger 1106 is only partially located within the recess 1134 and contacting the upper end of the slanted wall of the passage 1142. This is the default position that the gasket retention assembly 1100 may take during landing of the connector 112 and gasket 1105 onto the housing 110. In this position, the retention mechanism 1108 engages directly with the gasket profile 1140 to maintain the gasket 1105 in position against the connector 112.

In the system of FIG. 14, the connector 112 may be landed onto the housing 110 without the gasket retention assembly 1100 automatically releasing the gasket 1105. This is because there is no contact end of the plunger 1106 protruding from the connector 112 toward the housing 110. When it is desired to release the gasket 1105 from the connector 112, the gasket retention assembly 1100 may be disengaged via an ROV stabbing into the interface 1210 of FIG. 10 and providing a pressurized fluid input to the port 1102. This may increase the pressure in the port 1102 to a point that the pressure forces the plunger 1106 in a downward direction against the spring force from the spring 1130.

As the plunger 1106 is moved further downward, the radially large midsection 1150 of the plunger 1106 may move from a relatively upper position in the recess 1144 to a position generally in line with the intersecting recess 1134. Due to the slanted walls of the passage 1142 formed through the retention mechanism 1108, a leading edge of the plunger midsection 1150 may contact the slanted wall on one side (e.g., radially outer side) of the passage 1142 as the plunger 1106 moves. The plunger 1106 may transmit a force to the slanted wall of the passage 1142, which in turn pushes the retention mechanism 1108 in a radially outward direction against the spring 1132. Moving the plunger 1106 and, consequently, the retention mechanism 1108 in this way may withdraw the retention mechanism 1108 into the recess 1134 such that the retention mechanism 1108 is no longer in engagement with the gasket 1105.

The gasket 1105 may no longer be held against the connector 112 via the gasket retention assembly 1100 when an ROV or other fluid control mechanism is inputting pressure to the port 1102. The closure mechanism (e.g., 1110 of FIG. 10) may then be actuated closed after the pressure is input to the port 1102 in order to maintain the gasket 1105 in the released position while the connector 112 is removed from the gasket 1105 and housing 110. This allows an ROV to remove the gasket 1105 from the tubular assembly and replace it with a new gasket 1105. In embodiments where a closure mechanism 1110 is not present on the connector 112, however, the ROV may simply remain connected to the interface and maintain the pressure within the port 1102 as the connector 112 is lifted off the housing 110 and away from the disengaged gasket 1105.

Once the gasket 1105 has been replaced, the ROV may interface with the connector 112 again to remove or actuate the closure mechanism 1110 (if there is one) to an open position, or may simply disengage from the interface 1210 (if there is not a valve), thereby allowing the port 1102 to vent the pressurized fluid and enable the plunger 1106 to move back up. This movement of the plunger 1106 allows the retention mechanism 1108 to return to its engaged position holding the gasket 1105 in place against the connector 112. To retrieve the gasket 1105 with the connector 112, no action is needed since the gasket retention assembly 1100 is spring loaded into engagement with the gasket 1105.

Figure 15:
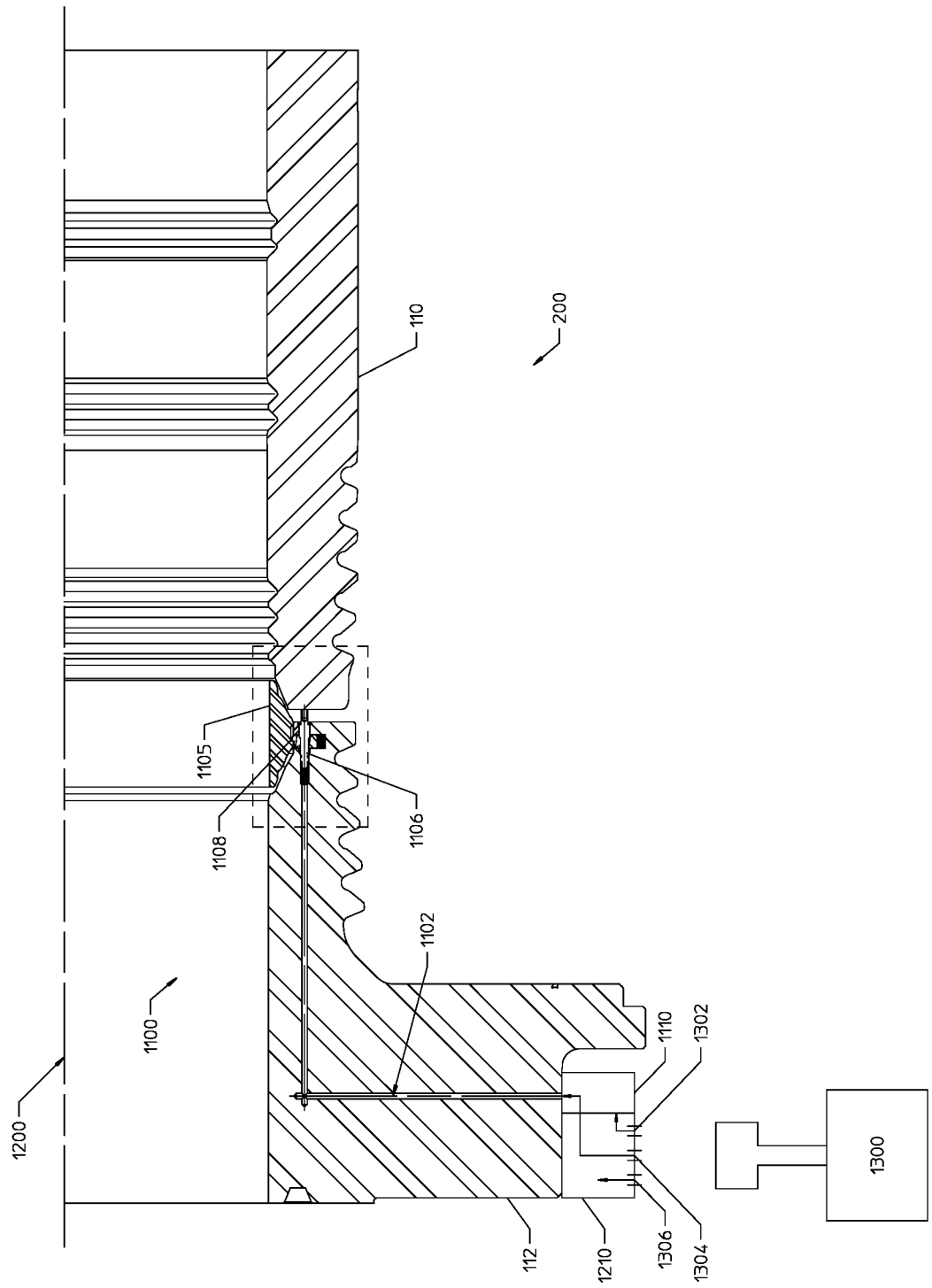
FIG. 15 is a partial side cross sectional of a tubular assembly having a gasket retaining assembly and multiple stab inputs for a remote operated vehicle (ROV), according to one or more aspects of the present disclosure.

FIG. 15 illustrates an embodiment of the tubular assembly 200 where the connector 112 includes an ROV interface 1210 that allows an ROV 1300 to stab into the connector 112 and perform multiple functions within the tubular assembly 200. The interface 1210 may include multiple hydraulic, electric, pneumatic, or other inputs 1302, 1304, and 1306 that each communicate control or fluid signals to the tubular assembly 200. For example, the input 1302 may communicate hydraulic, electric, pneumatic, or other control signals from the ROV 1300 for controlling operation of a closure mechanism 1110 in the gasket retention assembly 1100, as described above. The input 1304 may communicate hydraulic fluid from the ROV 1300 directly into the port 1102 of the gasket retention assembly 1100, as described above. The input 1306 may communicate hydraulic, electric, pneumatic, or other types of control signals from the ROV 1300 to the tubular assembly 200 for testing the gasket 1105. Other additional or different inputs may be utilized on the ROV interface 1210. The interface 1210 may include one or more wet-connect interfaces that sealingly connect the ROV 1300 to the one or more inputs on the connector 112. This arrangement of the interface 1210 may allow the ROV 1300 to simply stab into the connector 112 once and perform multiple different operations on the tubular assembly 200, such as testing the gasket 1105 and then releasing the gasket 1105.

Figure 16:
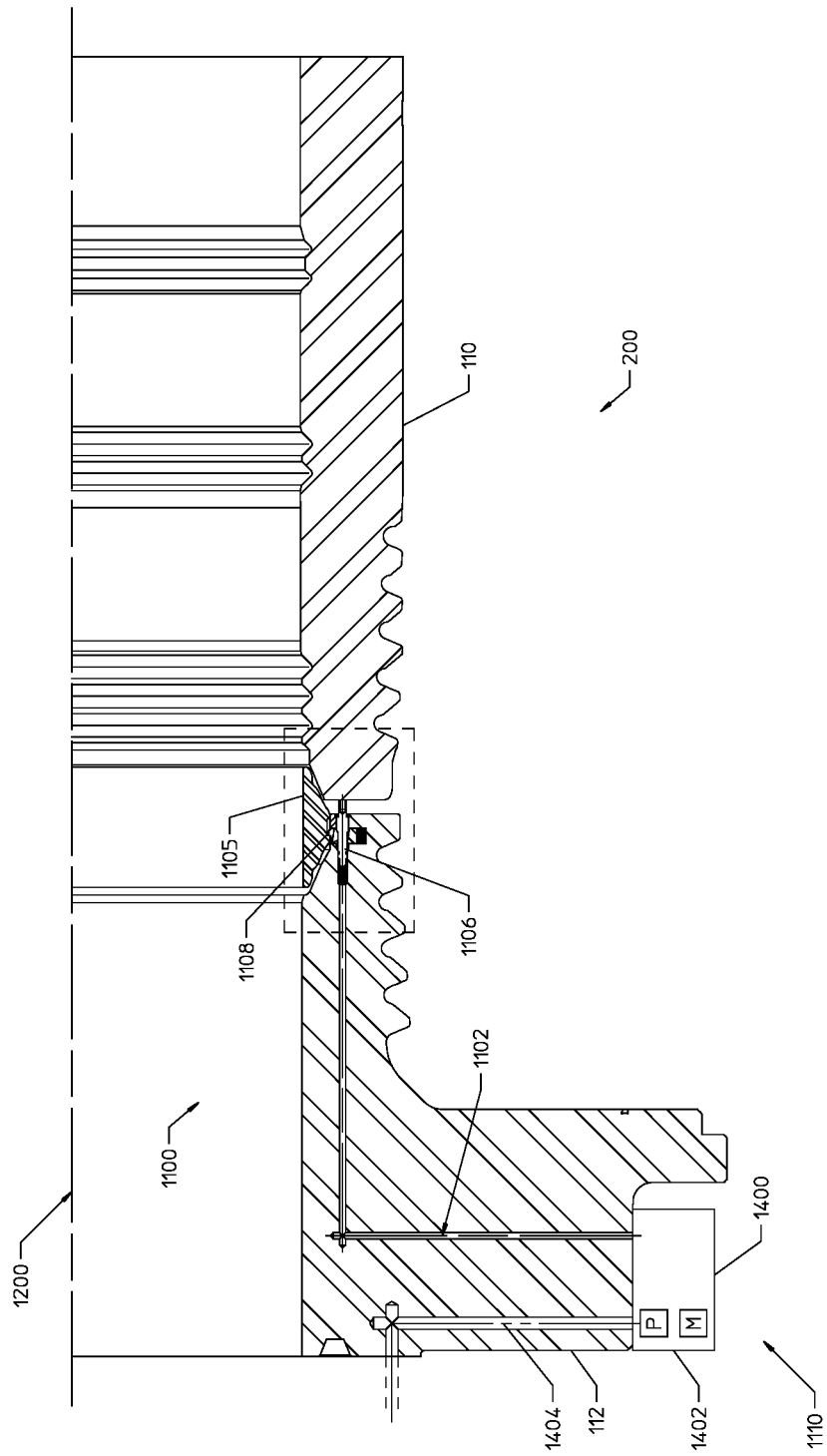
FIG. 16 is a partial side cross sectional of a tubular assembly having a gasket retaining assembly that is controlled via a control line from the surface, according to one or more aspects of the present disclosure.

Although the functions of the tubular assembly 200 and, more specifically, the disclosed gasket retention assembly 1100 have been described above as being controlled by inputs from an ROV, other embodiments of the tubular assembly 200 may utilize other methods for controlling the gasket retention assembly 1100. As shown in FIG. 16, for example, the closure mechanism 1110 on the connector 112 may include a solenoid valve 1400 coupled to a control system 1402. The control system 1402 may receive electrical control signals from the surface via a control line 1404 extending upward from the connector 112. Upon receiving a signal to open or close the port 1102, the control system 1402 may output an electrical signal to actuate the solenoid valve 1400 accordingly.

Although specific embodiments of the invention have been described herein in some detail, it is to be understood that this has been done solely for the purposes of describing the various aspects of the invention, and is not intended to limit the scope of the invention as defined in the claims which follow. Those skilled in the art will understand that the embodiment shown and described is exemplary and various other substitutions, alterations, and modifications, including but not limited to those design alternatives specifically discussed herein, may be made in the practice of the invention without departing from the spirit and scope of the invention.

What is claimed is:

1. An assembly, comprising:
   a first tubular member having a central bore, an end, and a conical sealing surface;
   a second tubular member having a central bore, an end, and a conical sealing surface; and
   a connector coupling the first tubular member to the second tubular member, wherein the end of the first tubular member and the end of the second tubular member engage each other at a similar internal diameter in a face-to-face relationship and the surface of the end of the first tubular member engages the entire surface of the end of the second tubular member; and
   a metal sealing ring having a central bore, a first conical sealing surface, and a second conical sealing surface,
   wherein the conical sealing surface of the first tubular member and the conical sealing surface of the second tubular member each comprise multiple conical surfaces separated by steps between adjacent conical surfaces,
   wherein the first tubular member comprises a straight vertical section along an internal diameter of the first tubular member, wherein the straight vertical section is located between the conical sealing surfaces of the first and second tubular members when the first and second tubular members are coupled together,
   wherein the first conical sealing surface of the metal sealing ring contacts each of the multiple conical surfaces of the conical sealing surface of the first tubular member and the second conical sealing surface of the metal sealing ring contacts each of the multiple conical surfaces of the conical sealing surface of the second tubular member when the metal sealing ring is engaged in a sealing relationship with the first and second tubular members.

2. The assembly of claim 1, wherein the end of the first tubular member and the end of the second tubular member engage each other at a similar internal diameter in a face-to-face relationship to facilitate an increase in bending/compression capacity of the assembly up to approximately 40% greater than a bending/compression capacity of a tubular assembly having a recess formed along an internal diameter of the tubular assembly to accommodate a ribbed segment of a gasket.

3. The assembly of claim 1, wherein the straight vertical section of the first tubular member interfaces directly with the conical sealing surface of the second tubular member at the similar internal diameter.

4. The assembly of claim 1, wherein the end of the first tubular member comprises a concave portion, the end of the second tubular member comprises a complementary convex portion, and wherein the concave portion is shaped to fit directly around the convex portion.

5. The assembly of claim 1, wherein the straight vertical section of the first tubular member interfaces directly with one of the multiple conical surfaces of the second tubular member at the similar internal diameter.

6. The assembly of claim 1, wherein the first conical sealing surface of the metal sealing ring includes multiple conical surfaces that each abut one of the multiple conical surfaces of the conical sealing surface of the first tubular member and the second conical sealing surface of the metal sealing ring includes multiple conical surfaces that each abut one of the multiple conical surfaces of the conical sealing surface of the second tubular member.

7. The assembly of claim 1, wherein a radially outermost region of the metal sealing ring does not comprise a ribbed section.

8. The assembly of claim 1, wherein the first conical sealing surface of the metal sealing ring further comprises at least one alignment segment and at least one sealing segment, and wherein the second conical sealing surface of the metal sealing ring comprises at least one alignment segment and at least one sealing segment.

9. The assembly of claim 1, further comprising a retention device disposed within the first tubular member or the second tubular member and extending therefrom to engage a profile of the metal sealing ring for retaining the metal sealing ring against the first tubular member or the second tubular member.

10. The assembly of claim 9, wherein the retention device is configured to be dislodged from engagement with the metal sealing ring using pressurized air or fluid delivered via a port.

11. The assembly of claim 1, wherein the metal sealing ring is made of metal and does not include an elastomer.

12. The assembly of claim 1, wherein the metal sealing ring is partially made of metal and includes an elastomer.

13. A method of sealing tubular components, comprising:
   providing a first tubular member having a central bore, an end, and a conical sealing surface, wherein the conical sealing surface of the first tubular member comprises multiple conical surfaces separated by steps between adjacent conical surfaces;
   providing a second tubular member having a central bore, an end, and a conical sealing surface, wherein the conical sealing surface of the second tubular member comprises multiple conical surfaces separated by steps between adjacent conical surfaces;
   aligning the end of the first tubular member with the end of the second tubular member at a similar internal diameter in a face-to-face relationship, wherein aligning the first tubular member to the second tubular member comprises engaging a straight vertical section of the first tubular member with the conical sealing surface of the second tubular member;
   engaging a metal sealing ring in a sealing relationship with the first and second tubular members, the metal sealing ring having a central bore, a first conical sealing surface, and a second conical sealing surface, wherein the first conical sealing surface of the metal sealing ring contacts each of the multiple conical surfaces of the conical sealing surface of the first tubular member and the second conical sealing surface of the metal sealing ring contacts each of the multiple conical surfaces of the conical sealing surface of the second tubular member; and coupling the first tubular member to the second tubular member using a connector such that the surface of the end of the first tubular member engages the entire surface of the end of the second tubular member.

14. The method of claim 13, wherein coupling the first tubular member to the second tubular member increases a bending/compression capacity of the connected tubular components up to approximately 40% greater than a bending/compression capacity of a tubular assembly having a recess formed along an internal diameter of the tubular assembly to accommodate a ribbed segment of a gasket.

15. The method of claim 13, wherein aligning the first tubular member to the second tubular member comprises engaging a concave portion at the end of the first tubular member with a complementary shaped convex portion at the end of the second tubular member.

* * * * *